(12) United States Patent
Takahashi

(10) Patent No.: US 10,444,481 B2
(45) Date of Patent: Oct. 15, 2019

(54) PRISM OPTICAL SYSTEM, PRISM OPTICAL SYSTEM-INCORPORATED IMAGE DISPLAY APPARATUS, AND PRISM OPTICAL SYSTEM-INCORPORATED IMAGING APPARATUS

(71) Applicant: OLYMPUS CORPORATION, Tokyo (JP)

(72) Inventor: Koichi Takahashi, Tokyo (JP)

( * ) Notice: Subject to any disclaimer, the term of this patent is extended or adjusted under 35 U.S.C. 154(b) by 16 days.

(21) Appl. No.: 15/806,463

(22) Filed: Nov. 8, 2017

(65) Prior Publication Data

US 2018/0067289 A1 Mar. 8, 2018

Related U.S. Application Data

(63) Continuation of application No. PCT/JP2015/063489, filed on May 11, 2015.

(51) Int. Cl.
*G02B 27/14* (2006.01)
*G02B 17/08* (2006.01)
(Continued)

(52) U.S. Cl.
CPC ............ *G02B 17/086* (2013.01); *G02B 5/04* (2013.01); *G02B 27/0081* (2013.01); *G02B 27/0172* (2013.01); *G02B 2027/0123* (2013.01)

(58) Field of Classification Search
CPC .... G02B 17/086; G02B 27/0172; G02B 5/04; G02B 27/0081; G02B 2027/0123; G02B 27/126; G02B 27/145
See application file for complete search history.

(56) References Cited

U.S. PATENT DOCUMENTS 6,952,598 B2 10/2005 Kiyomatsu et al.
7,502,168 B2 3/2009 Akutsu et al.
(Continued)

FOREIGN PATENT DOCUMENTS

JP 2001264681 A 9/2001
JP 2004325985 A 11/2004
(Continued)

OTHER PUBLICATIONS

International Search Report dated Jul. 21, 2015 issued in PCT/JP2015/063489.

*Primary Examiner* — Alicia M Harrington
(74) *Attorney, Agent, or Firm* — Scully, Scott, Murphy & Presser, P.C.

(57) ABSTRACT

A prism optical system has an optical element that includes, a first surface that defines a transmitting surface as an entrance surface and an internal reflecting surface as well, a second surface that defines an internal reflecting surface in opposition to the first surface, a third surface that defines an internal reflecting surface in opposition to the first surface and adjacent to the second surface, a fourth surface that defines an internal reflecting surface in opposition to the first surface and adjacent to the third surface and an internal reflecting surface closest to the image plane as well, and a fifth surface that defines a transmitting surface adjacent to the first surface and in opposition to the fourth surface; the fourth surface is defined by a rotationally asymmetric surface having a negative power in the Y-Z plane and a positive power in the X-direction perpendicular to the Y-Z plane.

11 Claims, 23 Drawing Sheets

(51) Int. Cl.
 *G02B 5/04* (2006.01)
 *G02B 27/00* (2006.01)
 *G02B 27/01* (2006.01)

(56) References Cited

U.S. PATENT DOCUMENTS

| | | |
|---|---|---|
| 9,195,066 B2 | 11/2015 | Komatsu et al. |
| 9,477,084 B2 | 10/2016 | Komatsu et al. |
| 2001/0027125 A1 | 10/2001 | Kiyomatsu et al. |
| 2007/0070504 A1 | 3/2007 | Akutsu et al. |
| 2008/0165424 A1* | 7/2008 | Togino ............... G02B 17/0848 359/637 |
| 2013/0134301 A1 | 5/2013 | Takahashi |
| 2013/0222896 A1 | 8/2013 | Komatsu et al. |
| 2015/0061975 A1 | 3/2015 | Komatsu et al. |
| 2015/0153573 A1 | 6/2015 | Komatsu et al. |

FOREIGN PATENT DOCUMENTS

| | | |
|---|---|---|
| JP | 2006003879 A | 1/2006 |
| JP | 2007094175 A | 4/2007 |
| JP | 2008076429 A | 4/2008 |
| JP | 2012027350 A | 2/2012 |
| JP | 2013200553 A | 10/2013 |
| JP | 2015072437 A | 4/2015 |
| JP | 2015106012 A | 6/2015 |

\* cited by examiner

FIG.8
(Y-direction)　　　　　　　　(X-direction)
( 3.40° , -4.60° )
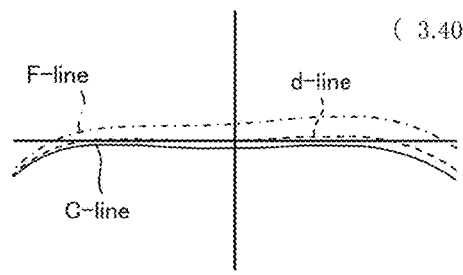 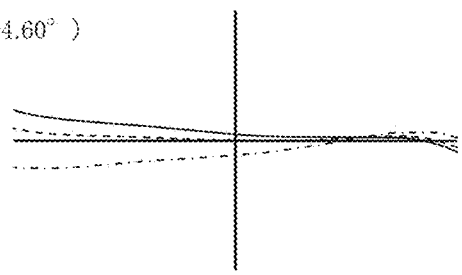
( 0.00° , -4.60° )
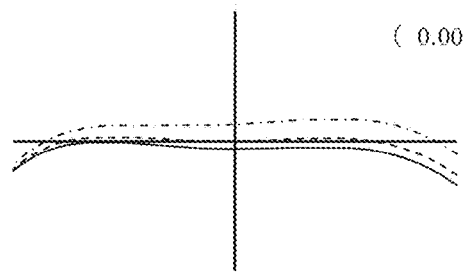 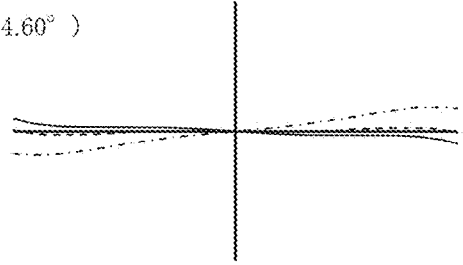
( 0.00° , 0.00° )
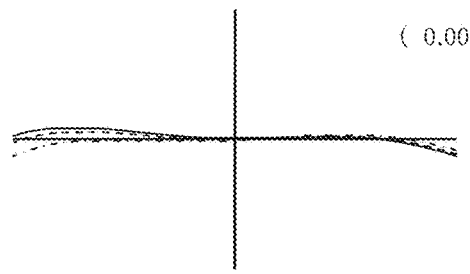 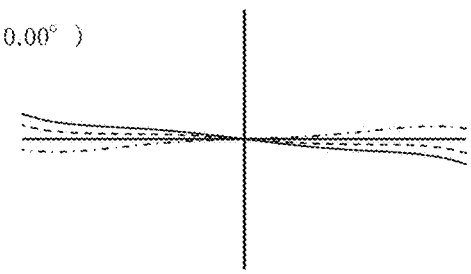

PRISM OPTICAL SYSTEM, PRISM OPTICAL SYSTEM-INCORPORATED IMAGE DISPLAY APPARATUS, AND PRISM OPTICAL SYSTEM-INCORPORATED IMAGING APPARATUS

CROSS-REFERENCE TO RELATED APPLICATIONS

This application is based on PCT/JP2015/063489 filed on May 11, 2015. The content of the PCT application is incorporated herein by reference.

BACKGROUND OF THE INVENTION AND RELATED ART STATEMENT

The present invention relates to a prism optical system that uses a rotationally asymmetric surface, an image display apparatus that incorporates a prism optical system, and an imaging apparatus that incorporates a prism optical system.

A prism optical system known so far in the art is typically a prism that includes a plurality of optical surfaces, and in the form of an optical system adapted to view an image display device, light emanating from the display device enters the prism for internal reflection, and exits out of the prism, arriving at the eyeballs of a viewer where an image is viewed as an enlarged virtual image. For prior arts concerning this, for instance, there is the mention of JP(A) 2008-076429 showing a prism wherein a first-order image is formed by at least three reflecting surfaces for projection onto the eyeballs, and JP(A) 2008-076429, JP(A) 2007-094175 and JP(A) 2004-325985 teaching that a hologram element is located at a lens site of eyeglasses.

Another conventional prism optical system includes a parallelogram prism wherein light is reflected a plurality of times and guided in front of the eyeballs of a viewer for projection through an eyepiece onto the eyeballs, or a light guide and an eyepiece for projection of light onto the eyeballs (see JP(A) 2001-264681 or JP(A) 2006-003879). Besides, it is proposed to make use of a prism including a combination of mutually decentered five optical surfaces to project an image from an image display device onto the eyeballs of a viewer (see Patent Publication JP(A) 2012-027350).

SUMMARY OF INVENTION

A prism optical system includes
an optical element that includes at least five optical surfaces, each having an optical action, wherein at least three out of the at least five optical surfaces are rotationally asymmetric surfaces and one of two surfaces on which light is incident or out of which light exits has one transmission and at least one internal reflection;

in a light ray traveling from an entrance pupil toward an image plane through the optical element, at least a portion of a reflecting surface closest to the image plane along an optical path has a negative power;

the optical element comprises, in order along a path taken by light that enters and exits out of the optical element, a first surface that defines a transmitting surface as an entrance surface and an internal reflecting surface as well, a second surface that defines an internal reflecting surface in opposition to the first surface, a third surface that defines an internal reflecting surface in opposition to the first surface and adjacent to the second surface, a fourth surface that defines an internal reflecting surface in opposition to the first surface and adjacent to the third surface and an internal reflecting surface closest to the image plane as well, and a fifth surface that defines a transmitting surface adjacent to the first surface and in opposition to the fourth surface; and given that the Z-axis positive direction is defined by a direction along a direction of travel of a center chief ray, perpendicular to a plane that defines the entrance pupil, from one point included in a dummy plane that is an origin through the center of the entrance pupil, the Y-Z plane is defined by a plane including the Z-axis and the center of the image plane, and a Y-axis positive direction comes close to a direction from the origin toward the center of the image plane, and an X-axis positive direction is defined by a direction that forms a right-handed orthogonal coordinate system with the Y-axis and the Z-axis, the fourth surface is defined by a rotationally asymmetric surface having a negative power in the Y-Z plane and a positive power in the X-direction perpendicular to the Y-Z plane.

A prism optical system includes
an optical element that includes at least five optical surfaces, each having an optical action, wherein at least three out of the at least five optical surfaces are rotationally asymmetric surfaces and one of two surfaces on which light is incident or out of which light exits has one transmission and at least one internal reflection;

in a light ray traveling from an entrance pupil toward an image plane through the optical element, at least a portion of a reflecting surface closest to the image plane along an optical path has a negative power;

the optical element comprises, in order along a path taken by light that enters and exits out of the optical element, a first surface that defines a transmitting surface as an entrance surface and an internal reflecting surface as well, a second surface that defines an internal reflecting surface in opposition to the first surface, a third surface that defines an internal reflecting surface in opposition to the first surface and adjacent to the second surface, a fourth surface that defines an internal reflecting surface in opposition to the first surface and adjacent to the third surface and an internal reflecting surface closest to the image plane as well, and a fifth surface that defines a transmitting surface adjacent to the first surface and in opposition to the fourth surface; and given that the Z-axis positive direction is defined by a direction along a direction of travel of a center chief ray, perpendicular to a plane that defines the entrance pupil, from one point included in a dummy plane that is an origin through the center of the entrance pupil, the Y-Z plane is defined by a plane including the Z-axis and the center of the image plane, a Y-axis positive direction comes close to a direction from the origin toward the center of the image plane, and an X-axis positive direction is defined by a direction that forms a right-handed orthogonal coordinate system with the Y-axis and the Z-axis, the fourth surface is defined by a rotationally asymmetric surface having a negative power in the Y-Z plane and a negative power in the X-direction perpendicular to the Y-Z plane.

BRIEF DESCRIPTION OF DRAWINGS

FIG. 8 is a set of transverse aberration diagrams for the whole prism optical system of Example 2 according to one embodiment.

DESCRIPTION OF EMBODIMENTS

Figure 1:
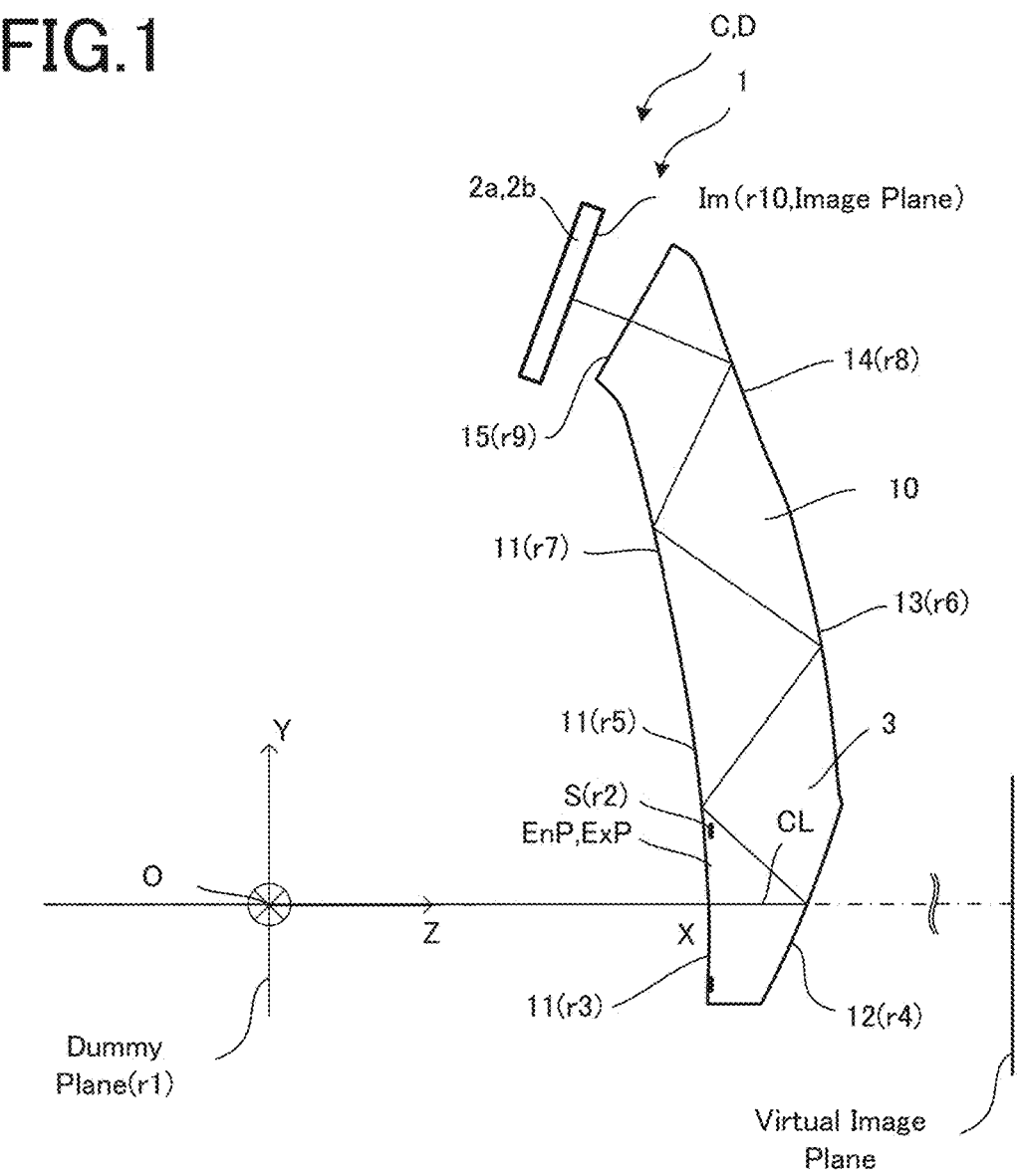
FIG. 1 is illustrative in arrangement of the prism optical system according to one embodiment.

FIG. 1 is illustrative in arrangement of the prism optical system according to one embodiment.

In a prism optical system 1 according to one embodiment used as an imaging apparatus C, light rays passing through an entrance pupil EnP of the prism optical system 1 are incident on the prism optical system 1 and imaged on an imaging plane or image plane Im of an imaging device 2a via the prism optical system 1, forming a real image. In the prism optical system 1 used as an image display apparatus D, on the other hand, light rays exiting out of a display plane or image plane Im of an image display device 2b enter the prism optical system 1 to form an exit pupil ExP through the prism optical system 1. The light rays are then incident on the eyeball of a viewer in the vicinity or in front of that exit pupil ExP, forming an enlarged virtual image. Back ray tracing then works for convenience of designing; in that case, the prism optical system may be perceived as the same optical system as the imaging system.

Referring here to a coordinate system for one embodiment, suppose that with a dummy plane set as a virtual pupil position of the viewer, the Z-axis positive direction is defined by a direction along the direction of travel of a center chief ray CL, perpendicular to a surface that defines the entrance pupil EnP, from one point included in that dummy plane through the center of the entrance pupil EnP that is an origin O, the Y-Z plane is defined by a plane including the Z-axis and the center of the image plane Im, and a Y-axis positive direction comes close to a direction from the origin O toward the center of the image plane Im, and an X-axis positive direction is defined by a direction that forms a right-handed orthogonal coordinate system with the Y-axis and the Z-axis.

With the prism optical system 1 according to the embodiment described herein, the single optical element 10 that is extremely small and lightweight, and has a high degree of freedom in shape can be used to image an external-world object by the imaging device 2a by way of the entrance pupil EnP and project an image from the image display device 2b onto the viewer's eyeball as a virtual image. This prism optical system 1 also makes it possible to take or project an image that is well corrected for aberrations inclusive of off-axis ones, has a high resolving power as far as the periphery of a screen involved, and is less distorted.

According to the embodiment described herein, the imaging device 2a and prism optical system 1 are used to provide an imaging apparatus C that can be reduced in size/weight and bring its cost down. According to the embodiment described herein, the imaging display device 2 and prism optical system 1 are used to provide an image display apparatus D that can be reduced in size/weight and bring its cost down, and allows the wearer to look objectively normal. For instance, there is a head-mounted type image display apparatus provided that makes it possible to view an external world and electronic images at the same time without blocking off the field of view for and external world, and can be reduced in size/weight and cost as well. The prism optical system 1 may include, in addition to the optical element 10, a cover, filters or the like unless its optical performance is much affected.

Thus, the prism optical system 1 as described herein includes a prism optical system including an optical element 10 that includes at least 5 optical surfaces, each having an optical action, wherein at least three out of the at least five optical surfaces are rotationally asymmetric surfaces and one of two surfaces on which light is incident or out of which light exits has one transmission and at least one internal reflection, and in a light ray traveling from an entrance pupil EnP toward an image plane Im through the optical element 10, at least a portion of a reflecting surface closest to the image plane Im along an optical path has a negative power.

Such an arrangement makes efficient use of the optical functions of the respective optical surfaces of the optical system 1 incorporating five optical surfaces, and in the form of a display system, an image from the image display device 20 is reflected multiple times and guided to the viewer's eyeball so that there can be an increase in the degree of freedom in the configuration of the prism optical system 1, and the relative positions of the image display device 2b and exit pupil ExP as well as the angles of incidence and exit of light rays can be placed in the desired state.

Further, the first surface 11 that works as the exit surface in the form of the image display apparatus D or as the entrance surface in the form of the imaging apparatus C is a combined input/output surface having transmission. If that surface is designed in such a way as to have transmission and internal reflection at the same time, it is then possible for its transmitting area to overlap with the reflecting area within the prism optical system 1. Further, if that surface is designed to have two internal reflections or there are two reflections by a single surface, it is then possible for two reflecting areas to overlap each other while being oblivious to any surface-to-surface seam. It is thus possible to make the prism optical system 1 itself compact, working in favor of apparatus's size and weight reductions.

Light reflected off the final reflecting surface 14 closest to the image plane Im takes on a light beam having a narrow diameter because of its proximity to the image plane Im. If a portion of the reflecting surface 14 nearest to the image plane Im on the optical path has a negative power, it then works in favor of correction of off-axis aberrations. Among the off-axis aberrations to be considered there are field curvature and distortion. In an optical system having generally imaging capability by way of positive power, there is field curvature occurring in a negative direction with respect to the image plane Im. If negative power is given to a portion of the reflecting surface 14 positioned just in front of and closest to the image plane Im, it is then possible to make correction of field curvature. Referring further to a similar optical system, distortion tends to become negative (the barrel type). Likewise, if negative power is imparted to a portion of the reflecting surface 14 positioned just in front of and closest to the image plane Im, it is then possible to make correction of distortion.

Thus, by imparting negative power to a portion of the reflecting surface 14 closest to the image plane Im, field curvature and distortion that are the off-axis aberrations of the prism optical system are corrected so much so that less distorted images can clearly be taken and viewed as far as the periphery of the screen used with. In addition, the shape of the prism optical element 10 is made so compact that when the prism optical system is used as the image display apparatus D, the wearer will hardly feel awkward or troublesome. In the case of the imaging apparatus, the prism optical system contributes much to reductions in the size and weight of the whole apparatus.

In the prism optical system 1, the optical element 10 includes, in order along a path taken by light that enters and exits out of the optical element, a first surface 11 that defines a transmitting surface as an entrance surface and an internal reflecting surface as well, a second surface 12 that defines an internal reflecting surface in opposition to the first surface 11, a third surface 13 that defines an internal reflecting surface in opposition to the first surface 11 and adjacent to the second surface 12, a fourth surface 14 that defines an internal reflecting surface in opposition to the first surface 11 and adjacent to the third surface 13 and a reflecting surface nearest to the image plane Im, and a fifth surface 15 that defines a transmitting surface adjacent to the first surface 11 and in opposition to the fourth surface 14.

According to the prism optical system 1 including such optical surfaces as described above, the first surface 11 is in opposition to the second 12, third 13 and fourth surface 14 with the result that there are multiple reflections within the left and right surfaces of the prism so that the optical element 10 can actually have a longer optical path, although it works as part of a much smaller prism optical system 1. On the other hand, the prism is configured substantially as a rod having a curved surface, meaning that it may be configured in conformity with the outer shape of the eyeglasses to be described later. In addition, the prism may be used as a part of the glass frame of eyeglasses.

Thus, the prismatic optical element 10 is substantially in a small, rod form so that when the image display apparatus D is located in front of the eyeballs of a viewer, it is possible to reduce an area likely to block off the viewer's field of view for the external world.

Further in the prism optical system 1, there are two internal reflections by the first surface 11 and there are internal reflections by the second 12, third 13, and fourth surface 14 before and after the surface 11. It is thus possible to place the tilt of the fourth surface 14 at a proper angle thereby locating the imaging device 2a or image display device 2b positioned on the image plane Im at any desired angle. It is also possible to place the tilt of the second surface 12 at an appropriate angle thereby setting the viewer's eyeballs in any desired position and at any desired angle. With the prism optical system 1 having such an arrangement, therefore, it is possible to set up the image display device 2b in a comparatively free relative position and at a comparatively free relative angle, thereby keeping it out of the way.

This would make it possible for the user to put on the prism optical system in a more comfortable fashion while the blind spot in the see-around function is held back or reduced upon viewing of an external-world image. The high degree of freedom in configuration permits the prism optical system 1 of this invention to be used as a part of the frame of eyeglasses so that those who put on the image display apparatus D could look objectively normal.

The fourth surface 14 is preferably a rotationally asymmetric surface having a negative power in the Y-Z plane.

In the Y-Z plane, the prism optical system 1 decentrates (tilts or shifts) considerably and the optical path through it is bent in a zigzag form. Such an optical system gives rise to large decenteration aberrations in the Y-Z plane, which must be corrected along with Sidel aberrations. Among off-axis decentration aberrations, asymmetric field curvature and field tilt must be taken into account.

Further, asymmetric distortion occurs as the decentration aberrations too. By use of the rotationally asymmetric surface, complicated asymmetric distortion must be corrected as is the case with correction of field tilt.

Importantly, the fourth surface 14 that is the reflecting surface closest to the image plane Im is defined by a rotationally asymmetric surface having a negative power in the Y-Z plane so as to correct it for those complicated off-axis decentration aberrations. By the negative power, off-axis aberrations that the optical system possesses as described above are corrected while, at the same time, off-axis aberrations due to decentration are corrected by rotational asymmetry.

The fourth surface 14 is also preferably a rotationally asymmetric surface having a positive power in the X-Z plane.

When there is no decentration in the X-Z plane of the optical surfaces that form the prism optical system 1, there is no need for taking correction of decentration aberrations into account. In some cases, it is desired to have more of positive power than correction of off-axis aberrations that the optical element 10 possesses.

At a relatively small angle of view, there is often none of large off-axis aberrations produced or, in other words, it is more desired to attach importance to correction of spherical aberrations and comas. In that case, the power in the X-Z plane of the fourth surface is so positive that the positive power of the whole optical system is dispersed to hold back spherical aberrations and comas, effectively improving on optical performance.

Here let cy(x, y) stand for the Y-direction curvature of a position of the fourth surface 14 where a center chief ray CL is reflected off and cx(x, y) stand for the X-direction curvature of a position of the fourth surface 14, through which the center chief ray CL transmits. It is then preferable to satisfy the following condition (1).

$$-4 < cy(x,y)/cx(x,y) < -0.01 \qquad (1)$$

Given the surface shape defined by f(x, y) in the position (x, y), the X-direction curvature cx(x, y) and the Y-direction curvature cy(x, y) in the position (x, y) are here intended to refer to the following.

$$Cx(x, y) = \frac{\frac{\partial^2 f}{\partial x^2}}{\left(1 + \left(\frac{\partial f}{\partial x}\right)^2\right)^{3/2}}$$

$$Cy(x, y) = \frac{\frac{\partial^2 f}{\partial y^2}}{\left(1 + \left(\frac{\partial f}{\partial y}\right)^2\right)^{3/2}}$$

By satisfaction of condition (1), the fourth surface 14 comes to have a negative power in the Y-Z plane and a positive power in the X-Z plane so that more preferable performance can be obtained in both the Y-Z and X-Z planes of the prism optical system 1 including five surfaces.

With the lower limit to condition (1) not reached, a difference in curvature between within the Y-Z plane and within the X-Z plane gets too large in general, and the negative power within the Y-Z plane gets too large in particular, resulting in overcorrection of distortion and field curvature.

Exceeding the upper limit to condition (1) causes the positive power within the X-Z plane to become too large, resulting in undercorrection of distortion and field curvature.

It is more preferable to satisfy the following condition (1)'.

$$-2.0 < cy(x,y)/cx(x,y) < -0.02 \qquad (1)'$$

The fourth surface 14 is preferably a rotationally asymmetric surface having a negative power in the X-Z plane.

In the X-Z plane, the optical surfaces forming the prism optical system 1 may possibly be not decentered. Although no care may be taken of correction of decentration aberrations in that case, yet it is desired for the fourth surface 14 to have a negative power for the purpose of correction of off-axis aberrations that the optical system possesses.

Total reflection is preferably applied to at least one internal reflection by the first surface 11.

Thus, if total reflection is applied to the internal reflection by the first surface 11, the first surface 11 has total reflection without recourse to any reflection coating. Since light may transmit through the total-reflection area due to its transparency, the first surface 11 may be used as the entrance or exit surface without taking any special means such as half-mirror coating and HOE. Further, a reflectivity of about 100% achievable by total reflection is higher than that of metal coating, preventing the overall efficiency from going down.

As a result, the prism optical system 1 may be fabricated at lower costs without recourse to any special coating or the like. Further, high reflectivity leads up to an efficient, energy-saving apparatus.

In the prism optical system 1, the first surface 11 is preferably a rotationally asymmetric surface.

Working as a transmitting surface and a surface having two internal reflections, the first surface 11 contributes more to correction of aberrations upon transmission and reflection.

It is consequently possible to obtain images that are well corrected for aberrations. In other words, the prism optical system 1 set up as the image display apparatus D allows for viewing of less distorted, clear-cut images while the system 1 set up as the imaging apparatus C allows for taking or imaging of less distorted, highly resolved images.

In the prism optical system 1, the first surface 11 has preferably a negative power in the X-Z plane.

The first surface 11 has two internal reflections, and those internal reflections are preferably total reflections. Referring to the total-reflection condition, the angle of incidence at a point of reflection must be greater than the critical angle. When the vitreous material of the prism has a refractive index n, the critical angle $\theta c$ is given by $\theta c = \arcsin(1/n)$. For instance, when n=1.5, $\theta c$=41.81°. If the angle of incidence on the first surface 11 is greater than 41.81°, therefore, total reflection takes place. Given that the first surface 11 has a positive power, all light bundles or beams are hard to have an angle of incidence greater than the critical angle, because at a certain portion of incident light from above in an oblique direction, the direction of the normal to that surface turns to the direction of incident light and the angle of incidence tends to decrease. If, in the Y-Z plane including the center chief ray CL, the first surface 11 has a negative power with a convex surface facing the incident light, the angles of incidence of all light beams tend to become large enough to satisfy the total-reflection condition.

As a result, the prism optical system 1 may be fabricated at lower costs because there is no need for using any special coating or the like except for ordinary reflection coating. In addition, total reflection has a reflectivity higher than that of reflection coating, ending up with an efficient, energy-saving apparatus.

In the prism optical system 1, the third surface 13 is preferably a rotationally asymmetric surface.

The third surface 13 has internal reflection, and located in an intermediate position of the prism optical system 1 with the result that the respective light beams have a relatively large sectional area in association with a negative power brought about by transmission through and internal reflection by the first surface 11, so spherical aberrations and comas are likely to occur due to decentration of that surface at the time when it undergoes reflection. To prevent large aberrations from occurring from this decentratioion is desired for improvements in the performance of the whole prism optical system 1.

It is consequently possible to obtain images that are well corrected for aberrations. In other words, the prism optical system 1 set up as the image display apparatus D allows for viewing of less distorted, clear-cut images while the system 1 set up as the imaging apparatus C allows for taking or imaging of less distorted, highly resolved images.

In the prism optical system 1, the second surface 12 is preferably a rotationally asymmetric surface.

The second surface 12 is an internal reflecting surface. Given the imaging apparatus C, comas are likely to occur from the decentration (tilt) of the second surface 12, because it is positioned just after the entrance pupil and entrance surface of the optical system, so the sectional areas of the respective light beams having different angles of incidence are substantially identical and relatively large. Correction of decentration aberrations at the surface where they occur or, in another parlance, prevention of occurrence of large decentration aberrations is desired for improvements in the performance of the whole prism optical system.

It is consequently possible to obtain images that are well corrected for aberrations. In other words, the prism optical system 1 set up as the image display apparatus D has viewing less distorted, clear-cut images while the system 1 set up as the imaging apparatus C has taking less distorted, highly resolved images.

In the prism optical system 1, the second surface has preferably a positive power in the Y-Z plane.

It is effective that the second surface is preferably defined by a surface that has a positive power allowing for internal reflection in the Y-Z plane inclusive of the center chief ray CL. If the first surface 11 is defined by a surface having a negative power, one or more of the second 12, third 13 and fourth surface 14 must then have a positive power so as to set up the optical system as an imaging system. Here take an imaging system wherein the image plane Im is formed by substantially parallel light rays incident from the entrance pupil EnP as an example. If the second surface 12 has a positive power, the incident light strikes upon the negative power of the first surface and, soon later, upon the positive power due to the power layout of the prism optical system 1 so that the whole prism optical system 1 can have a positive power with relative ease.

It is consequently possible to obtain images that are well corrected for aberrations. In other words, the prism optical system 1 set up as the image display apparatus D allows less distorted, clear-cut images to viewed while the system 1 set up as the imaging apparatus C has taking less distorted, highly resolved images.

Preferably, the image display apparatus D includes an image display device 2b located in opposition to the fifth surface 15 of the prism optical system 1 and viewer's eyes located in opposition to the transmitting area of the first surface 11 to present an enlarged virtual image to the viewer.

Light emanating from the image display device 2b enters the prism optical system 1 from the fifth surface 15, are internally reflected five times off the fourth 14, first 11, third 13, first 11 and second surface 12, and exits out of the first surface 11 as substantial parallel light, entering the pupils of the viewer.

According to the image display apparatus D having such an arrangement, it is possible for the viewer to view an enlarged virtual image.

Preferably, the exit pupil ExP is formed in the vicinity of an exit window of the first surface 11 of the prism optical system 1 or between the first surface 11 and the viewer's eyeballs.

As the exit pupil ExP of the image display device 2b is formed in the vicinity of an exit window of the first surface 11 of the prism optical system 1 or between the first surface 11 and the viewer's eyeballs, it is possible to reduce shadings of marginal light beams of an image under observation. According to the image display apparatus D of such an arrangement, it is possible for the viewer to take a view of images that are clear-cut as far as the periphery of the screen involved.

The imaging apparatus C according to the invention described herein includes an imaging device 2a located in opposition to the fifth surface 15 of the prism optical system 1 and an aperture stop located in front of, and in the vicinity of, the transmitting area of the first surface 11 to take an external-world image.

An aperture stop S having a circular aperture is located underneath and near the first surface 11, and an imaging device such as CCD is located in opposition to the fifth surface 15 so that light incident on the prism from its first surface 11 after passing through the aperture stop S is reflected five times off the second 12, first 11, third 13, first 11 and fourth surface 14, exiting out of the fifth surface 15, and arriving and converging on the imaging device 2a.

According to such an arrangement, it is possible to achieve the imaging apparatus C that is reduced in terms of size and weight.

In what follows, the prism optical system 1 described herein will be explained with reference to examples.

The setup parameters of these optical systems will be described later. Suppose here that as shown typically in FIG. 1, a position (pupil position) where the viewer takes a look of images is defined as the dummy plane of the prism optical system 1 in back ray tracing. These parameters are based on the results of ray tracing for an imaging system wherein light rays passing through the dummy plane travel through the prism optical system 1 toward the imaging device 2a, and back ray tracing for a display system wherein such light rays travel through the prism optical system 1 toward the image display device 2b.

Referring to the coordinate system here, as depicted in FIG. 1, the point O of intersection of the dummy plane r1 with the center chief ray CL is defined as the optical origin O of a decentered optical system. Then, a direction of the center chief ray CL from the origin O toward the prism optical system 1 side is defined as the Z-axis positive direction; the direction orthogonal to the Z-axis on the image display device 2 side from the origin O is defined as the Y-axis positive direction; and the sheet plane of FIG. 1 is defined as the Y-Z plane. Then, an axis that forms a right-handed orthogonal coordinate system with the Y- and Z-axes is defined as the X-axis positive direction.

Given to each decentered surface are the amount of decentration of the coordinate system, on which that surface is defined, from the center of the origin of the optical system (X, Y and Z in the X-, Y- and Z-axis directions) and the angles ($\alpha$, $\beta$, $\gamma$(°)) of tilt of the coordinate system for defining each surface about the X-, Y- and Z-axes of the coordinate system defined on the origin of the optical system. In that case, the positive $\alpha$ and $\beta$ mean counterclockwise rotation with respect to the positive directions of the respective axes, and the positive $\gamma$ means clockwise rotation with respect to the positive direction of the Z-axis. Referring here to the $\alpha$, $\beta$, $\gamma$ rotation of the center axis of a certain surface, the coordinate system for defining each surface is first $\alpha$ rotated counterclockwise about the X-axis of the coordinate system defined on the origin of the coordinate system. Then, it is $\beta$ rotated counterclockwise about the Y-axis of the thus rotated, new coordinate system, and finally γ rotated clockwise about the Z-axis of the thus rotated, new another coordinate system.

When a specific surface of the optical function surfaces forming the optical system of each example and the subsequent surface form together a coaxial optical system, there is a surface separation given. Besides, the radii of curvature of the surfaces, and the refractive indices and Abbe constants of the media are given as usual.

It is also noted that coefficient terms to which no data are given in the following setup parameters are zero. The refractive indices and Abbe constants on a d-line basis (587.56 nm wavelength) are given, and length is given in mm. The decentration of each surface is represented by the quantity of decentration from the reference surface, as mentioned above.

The surface shape of the free-form surface used in the embodiments is defined by the following formula (a). Note here that the Z-axis in that defining formula stands for the Z-axis of the free-form surface.

$$Z=(r^2/R)[1+\sqrt{1-(1+k)(r/R^2)}]$$

$$\infty+\Sigma C_j X^m Y^n$$

$$j=1 \quad\quad\quad (a)$$

Here the first term of Formula (a) is the spherical term, and the second term is the free-form surface term.

In the spherical term,
R is the radius of curvature of the apex,
k is the conic constant, and
r is $\sqrt{(X^2+Y^2)}$.
The free-form surface term is:

$$\sum_{j=1}^{66} C_j X^m Y^n = C_1 + C_2 X + C_3 Y + C_4 X^2 + C_5 XY + C_6 Y^2 +$$
$$C_7 X^3 + C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y + C_{18} X^3 Y^2 +$$
$$C_{19} X^2 Y^3 + C_{20} XY^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 + C_{29} X^7 + C_{30} X^6 Y +$$
$$C_{31} X^5 Y^2 + C_{32} X^4 Y^3 + C_{33} X^3 Y^4 + C_{34} X^2 Y^5 + C_{35} XY^6 + C_{36} Y^7$$

where $C_j$ is a coefficient (j is an integer greater than 1).

Generally, although the free-form surface has not possibly a surface of symmetry in both the X-Z and Y-Z planes, yet it will have only one surface of symmetry parallel with the Y-Z plane by reducing all the odd-numbered terms for X down to zero. For instance, this may be achieved by reducing the coefficients $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{34}$, $C_{33}$, $C_{35}$ ... in the defining formula (a) down to zero.

Also, by reducing all the odd-numbered terms for Y down to zero, for instance, by reducing $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$ ... in the defining formula down to zero, the free-form surface will have only one surface of symmetry parallel with the X-Z plane.

If the optical system is decentered in any one direction of the surfaces of symmetry, for instance, the Y-axis direction with respect to the surface of symmetry parallel with the Y-Z plane, and the X-axis direction with respect to the surface of symmetry parallel with the X-Z plane, it is then possible to improve assembling capability while making effective correction for rotationally asymmetric aberrations occurring from decentration.

It is here to be noted that the defining formula (a) is provided for the purpose of illustration alone. The free-form surface according to the invention has a feature of using a rotationally asymmetric surface thereby making correction for rotationally asymmetric aberrations occurring from decentration while, at the same time, improving assembling capabilities. As a matter of course, the same effect is achievable for any other defining formula too.

Examples of the embodiments described herein will now be explained.

Figure 2:
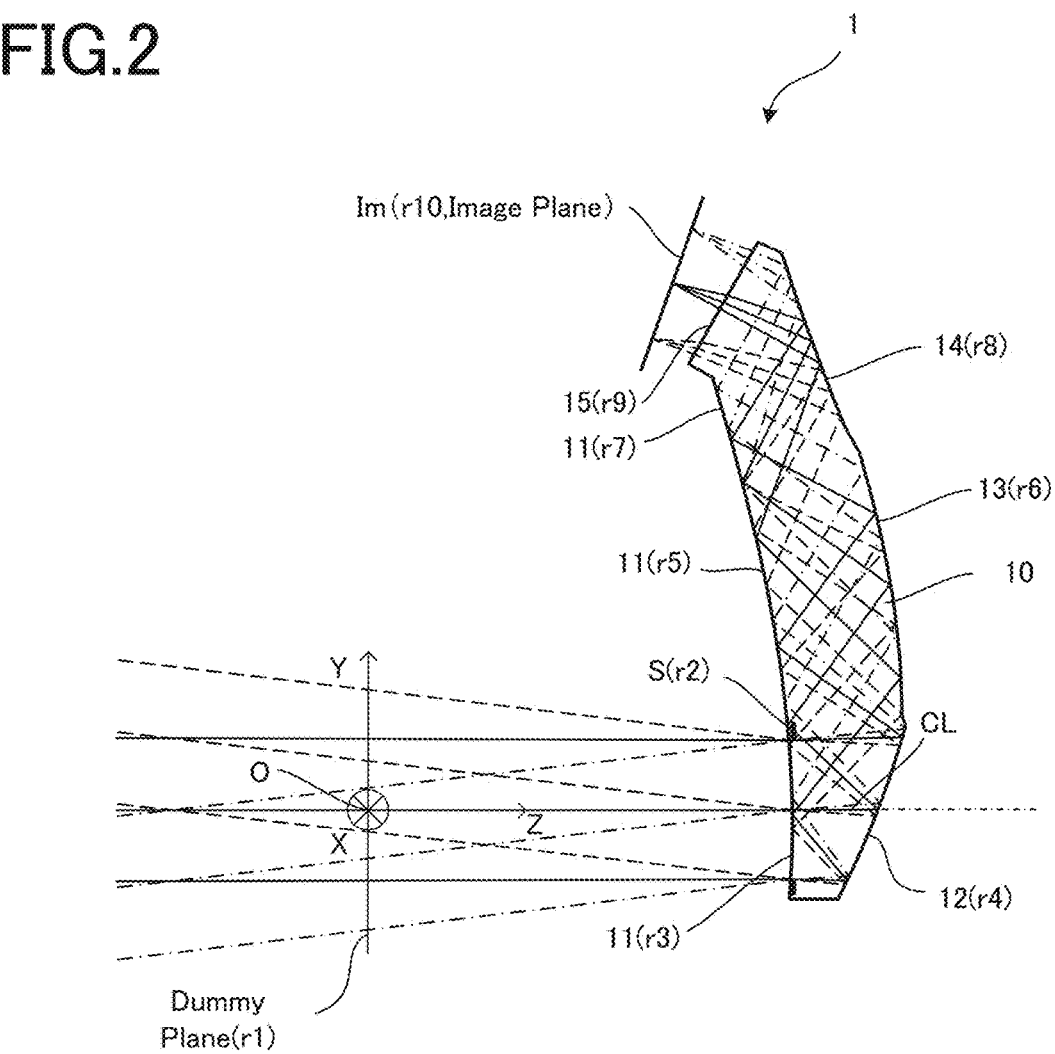
FIG. 2 is an optical path diagram in the Y-Z section for the prism optical system of Example 1 according to one embodiment.
Figure 3:
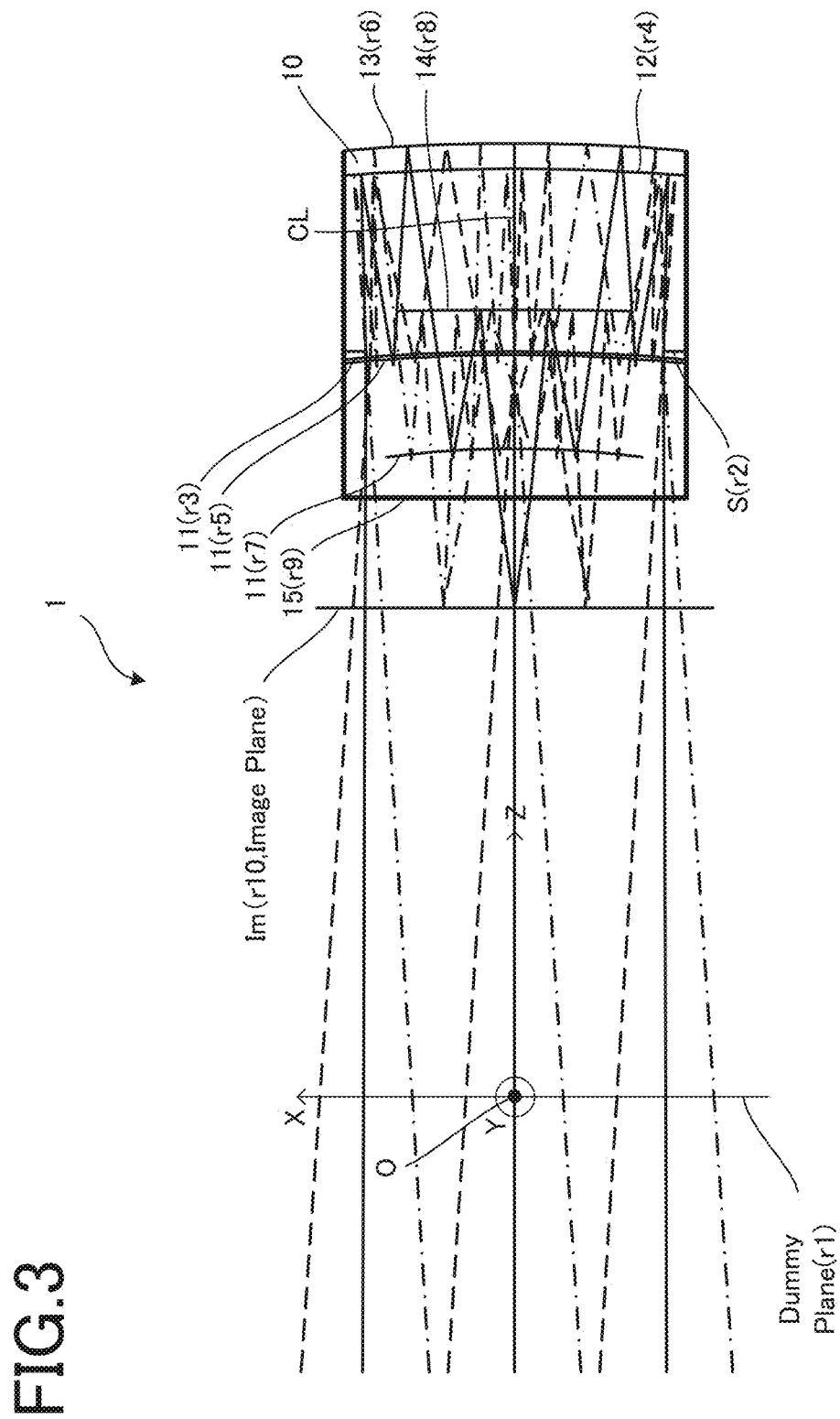
FIG. 3 is an optical path diagram in the X-Z section for the prism optical system of Example 1 according to one embodiment.
Figure 4:
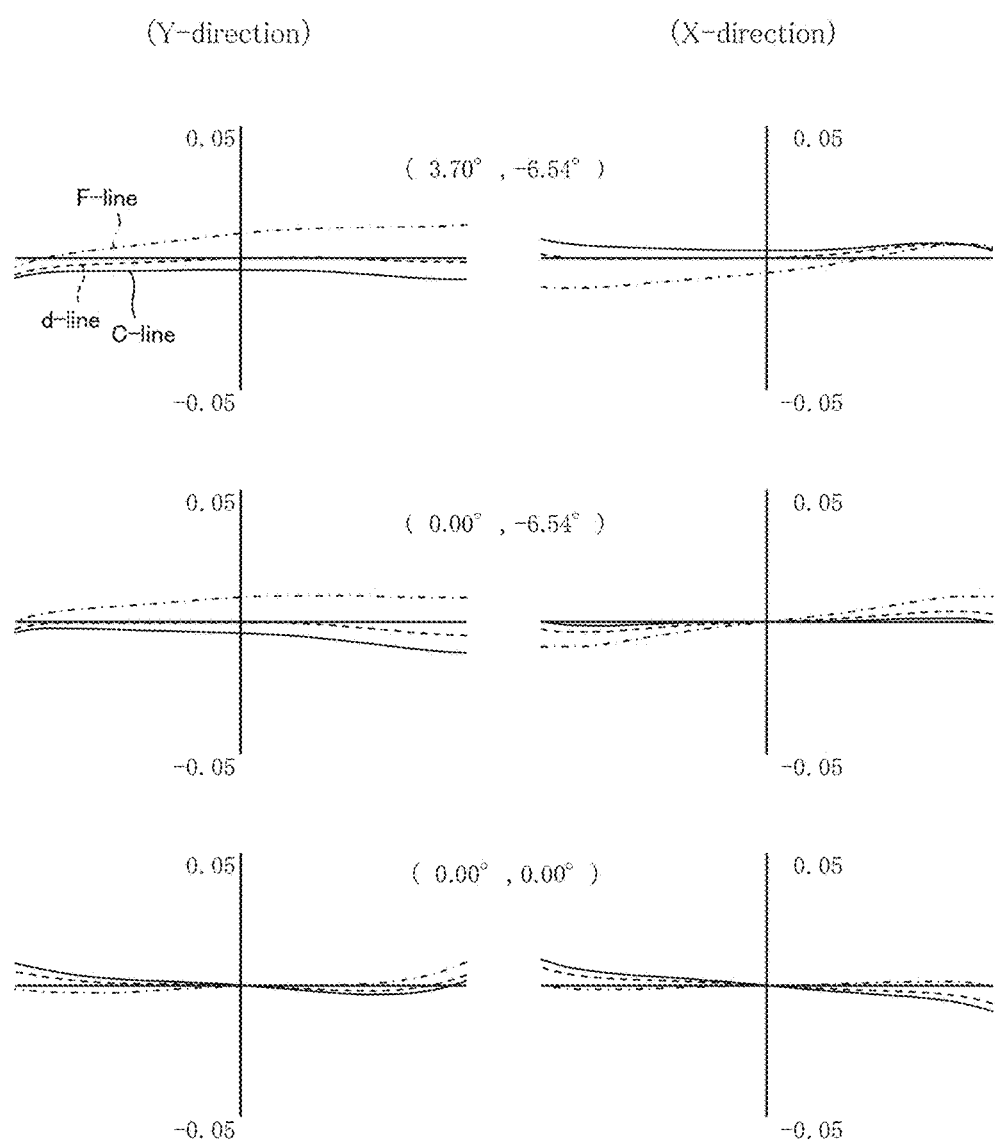
FIG. 4 is a set of transverse aberration diagrams for the whole prism optical system of Example 1 according to one embodiment.
Figure 5:
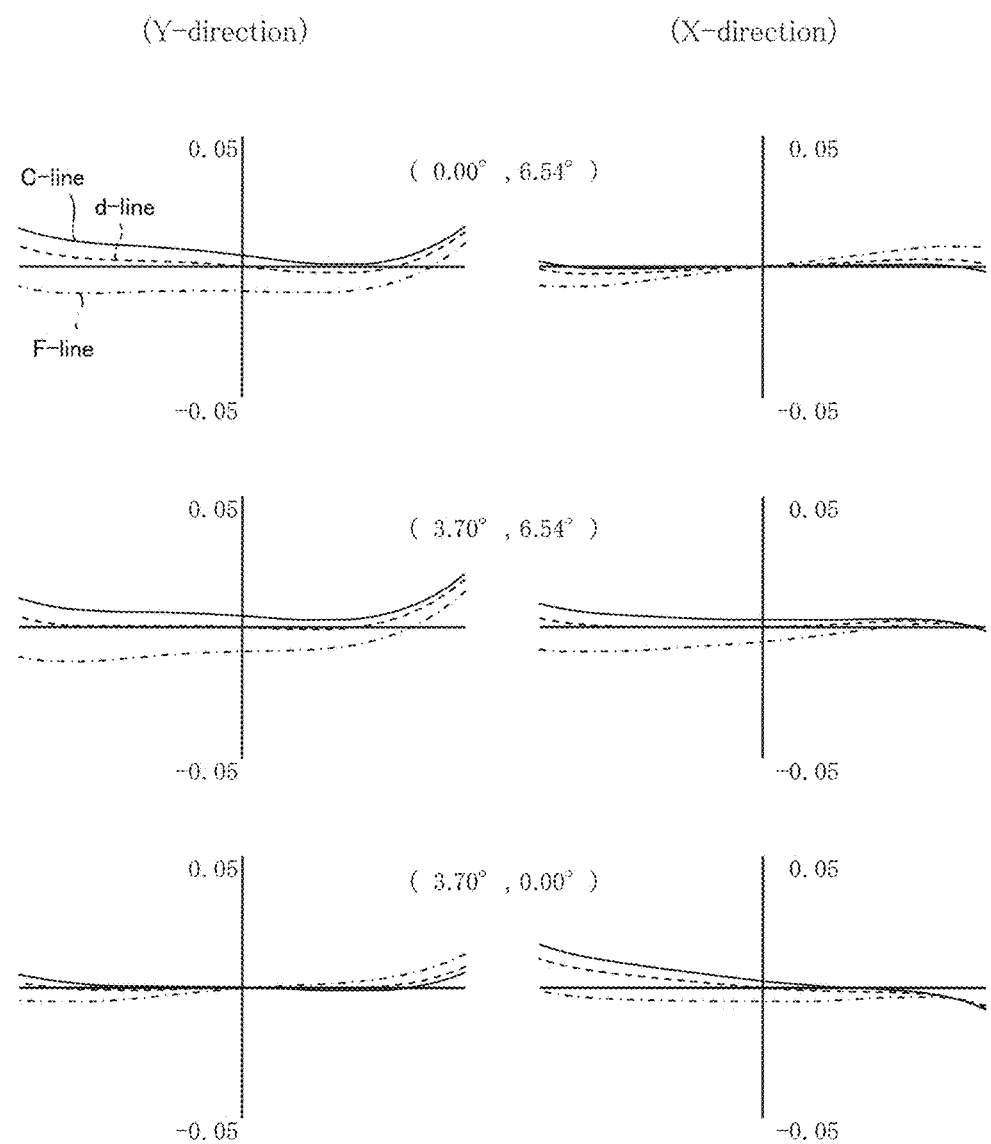
FIG. 5 is a set of transverse aberration diagrams for the whole prism optical system of Example 1 according to one embodiment.

FIG. 2 is an optical path diagram in the Y-Z section for the prism optical system of Example 1 according to one embodiment. FIG. 3 is an optical path diagram in the X-Z section for the prism optical system of Example 1 according to one embodiment. FIGS. 4 and 5 are sets of transverse aberration diagrams for the whole prism optical system of Example 1 according to one embodiment.

The prism optical system 1 of Example 1 includes an optical element 10 having a first surface 11 that is a transmitting surface as an entrance surface and an internal reflecting surface as well, a second surface 12 that is an internal reflecting surface in opposition to the first surface 11, a third surface 13 that is an internal reflecting surface located in opposition to the first surface 11 and adjacent to the second surface 12, a fourth surface 14 that is an internal reflecting surface in opposition to the first surface 11 and adjacent to the third surface and makes up a reflecting surface closest to an image plane, and a fifth surface 15 that is a transmitting surface adjacent to the first surface 11 and in opposition to the fourth surface 14.

The free-form surface is applied to the first 11, second 12, third 13, and fourth surface 14 as the rotationally asymmetric surface.

In the case of an imaging system, a light beam enters the optical element 10 through the first surface 11, is internally reflected off the first surface 11, off the third surface 13, off the first surface 11 and off the fourth surface 14, and exits out of the prism optical system 1 through the fifth surface 15, forming an image on an image plane Im.

In back ray tracing in the case of a display system, a light beam enters the optical element 10 through the fifth surface 15, is internally reflected off the fourth surface 14, off the first surface 11, off the third surface 13, the first surface 11 and off the second surface 12, and exits out of the prism optical system 1 through the first surface 11.

Figure 6:
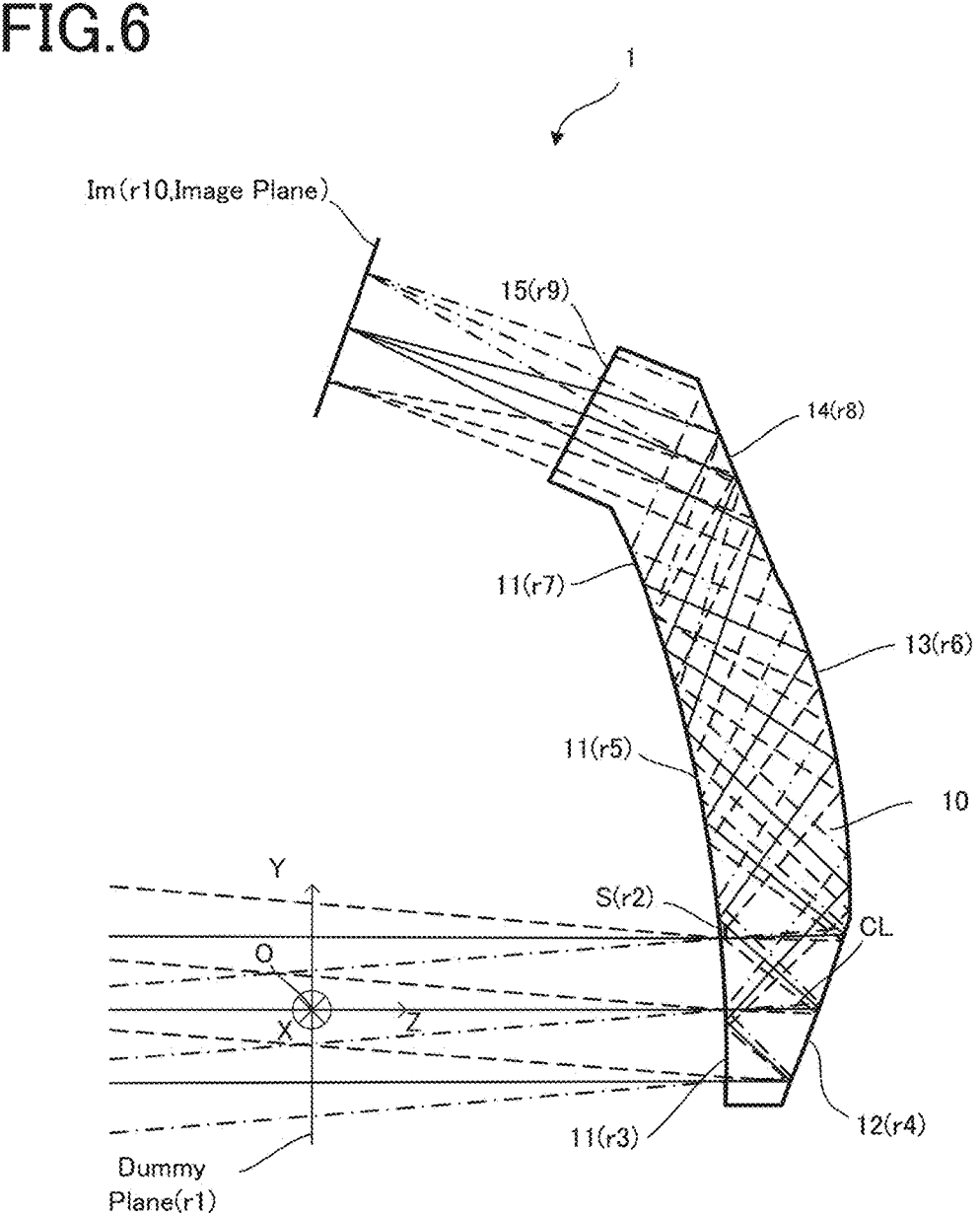
FIG. 6 is an optical path diagram in the Y-Z section for the prism optical system of Example 2 according to one embodiment.
Figure 7:
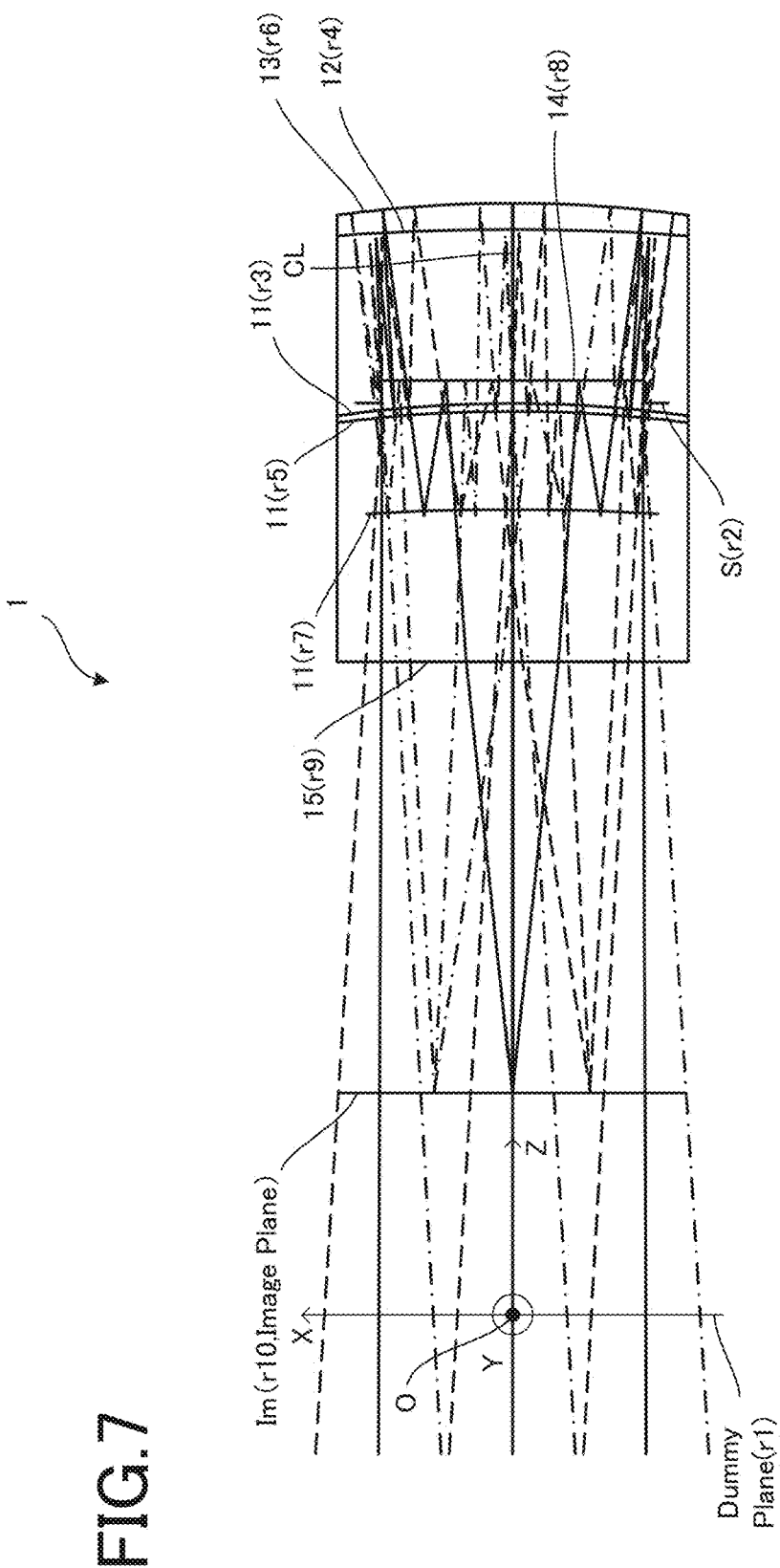
FIG. 7 is an optical path diagram in the X-Z section for the prism optical system of Example 2 according to one embodiment.
Figure 9:
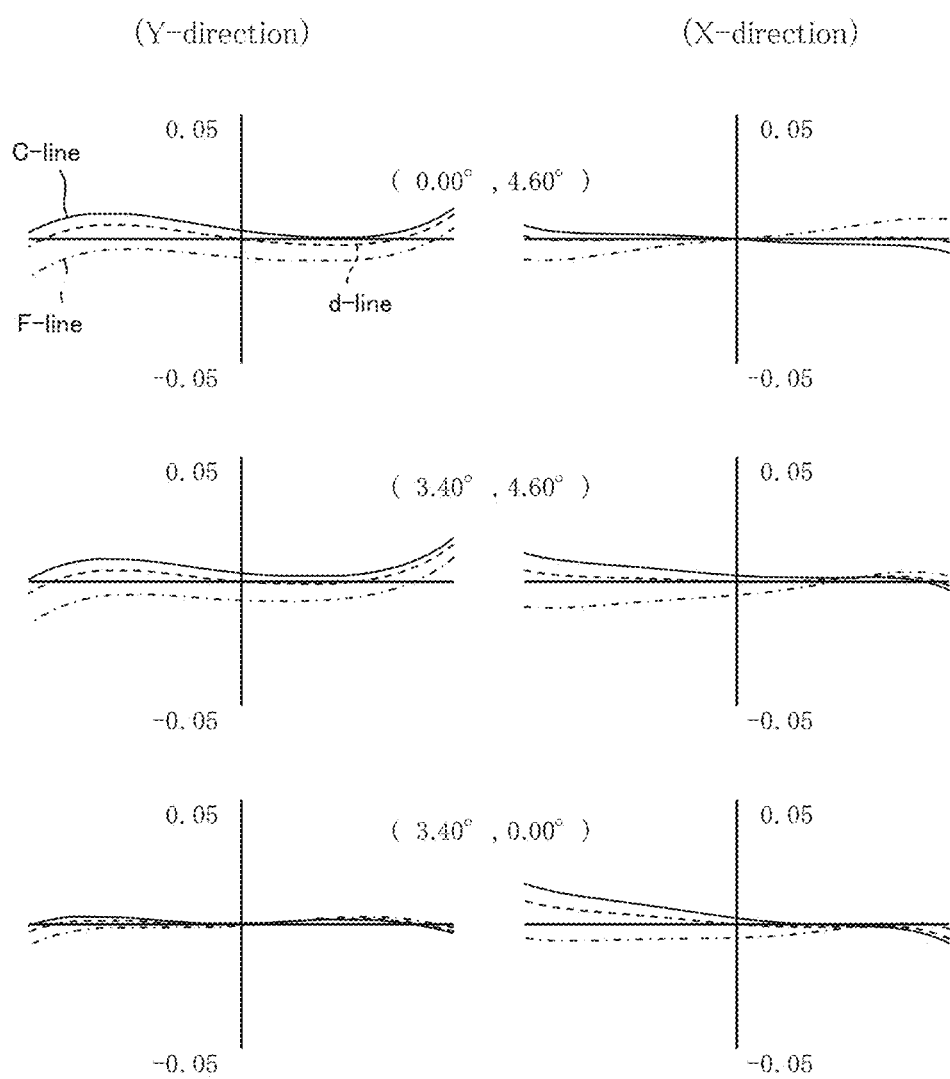
FIG. 9 is a set of transverse aberration diagrams for the whole prism optical system of Example 2 according to one embodiment.

FIG. 6 is an optical path diagram in the Y-Z section for the prism optical system of Example 2 according to one embodiment. FIG. 7 is an optical path diagram in the X-Z section for the prism optical system of Example 2 according to one embodiment. FIGS. 8 and 9 are sets of transverse aberration diagrams for the whole prism optical system of Example 2 according to one embodiment.

The prism optical system 1 of Example 2 includes an optical element 10 having a first surface 11 that is a transmitting surface as an entrance surface and an internal reflecting surface as well, a second surface 12 that is an internal reflection in opposition to the first surface 11, a third surface 13 that is an internal reflecting surface in opposition to the first surface 11 and adjacent to the second surface 12, a fourth surface 14 that is an internal reflecting surface in opposition to the first surface 11 and adjacent to the third surface 13 and makes up a reflecting surface closest to the image plane, and a fifth surface 15 that is a transmitting surface adjacent to the first surface 11 and in opposition to the fourth surface 14.

The free-form surface is applied to the first 11, second 12, third 13, and fourth surface 14 as the rotationally asymmetric surface.

In the case of the imaging system, a light beam enters the optical element 10 through the first surface 11, is internally reflected off the second surface 12, off the first surface 11, off the third surface 13, off the first surface 11 and off the fourth surface 14, and exits out of the prism optical system 1 through the fifth surface 15, forming an image on the image plane Im.

In back ray tracing in the case of the display system, a light beam enters the optical element 10 through the fifth surface 15, is internally reflected off the fourth surface 14, off the first surface 11, off the third surface 13, off the first surface 11 and off the second surface 12, and exits out of the prism optical system 1 through the first surface 11.

Figure 10:
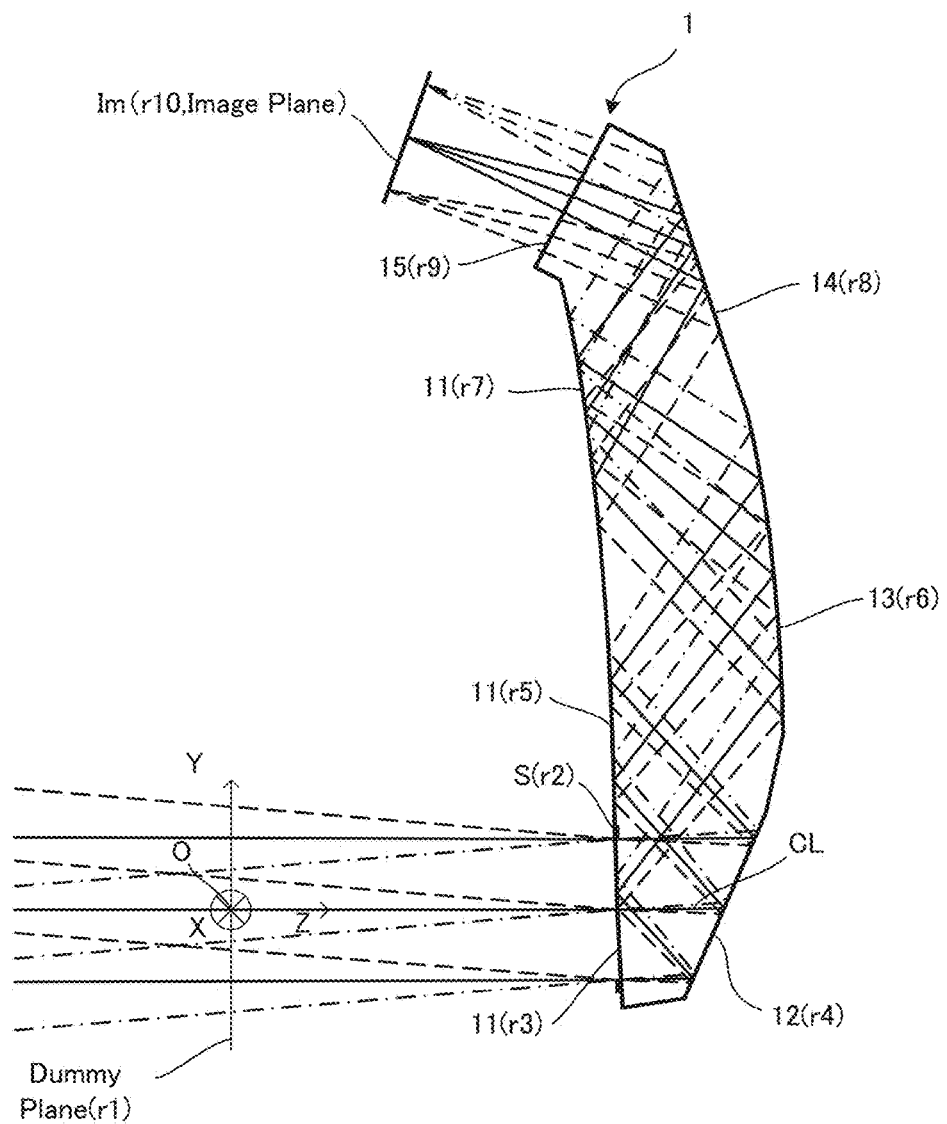
FIG. 10 is an optical path diagram in the Y-Z section for the prism optical system of Example 3 according to one embodiment.
Figure 11:
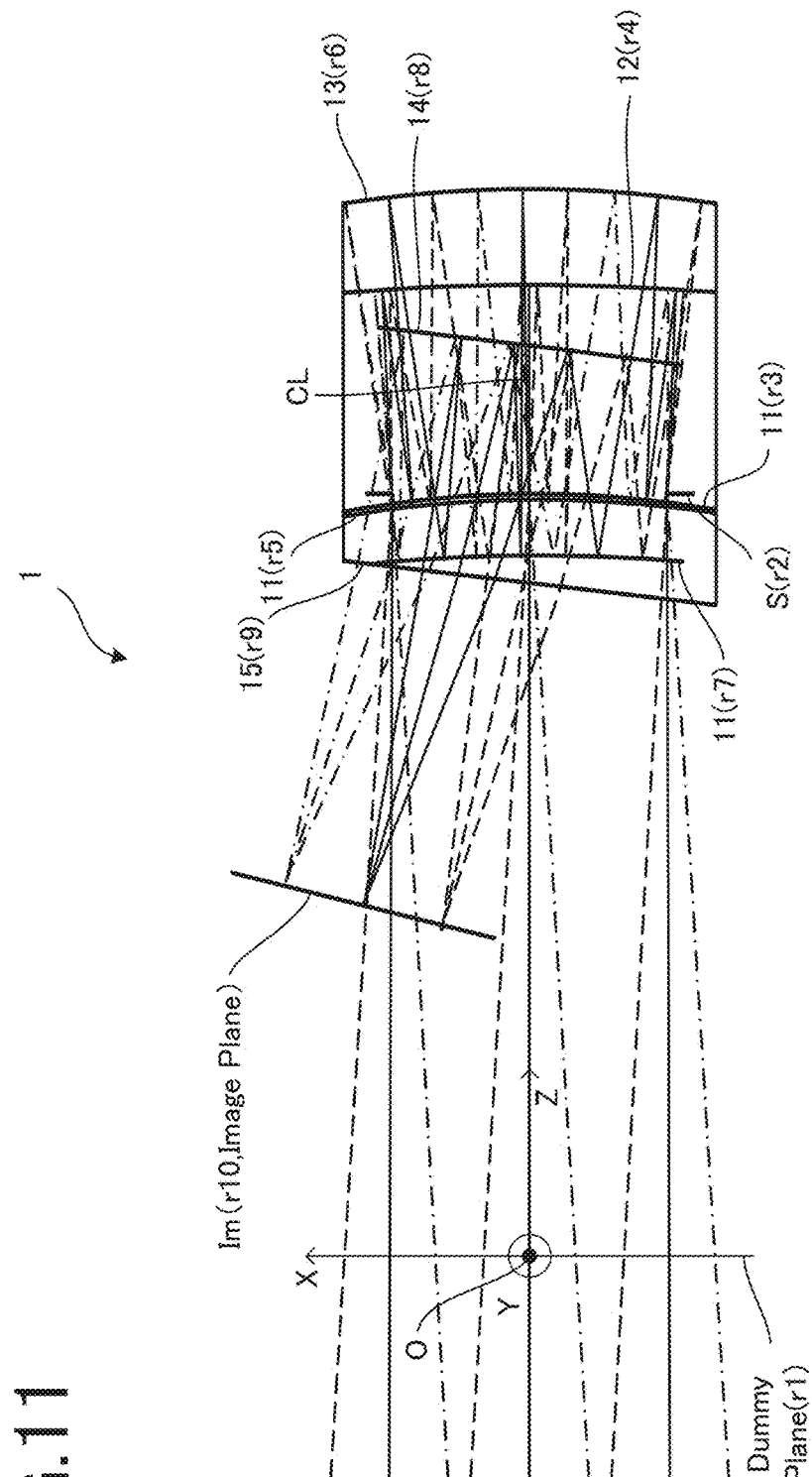
FIG. 11 is an optical path diagram in the X-Z section for the prism optical system of Example 3 according to one embodiment.
Figure 12:
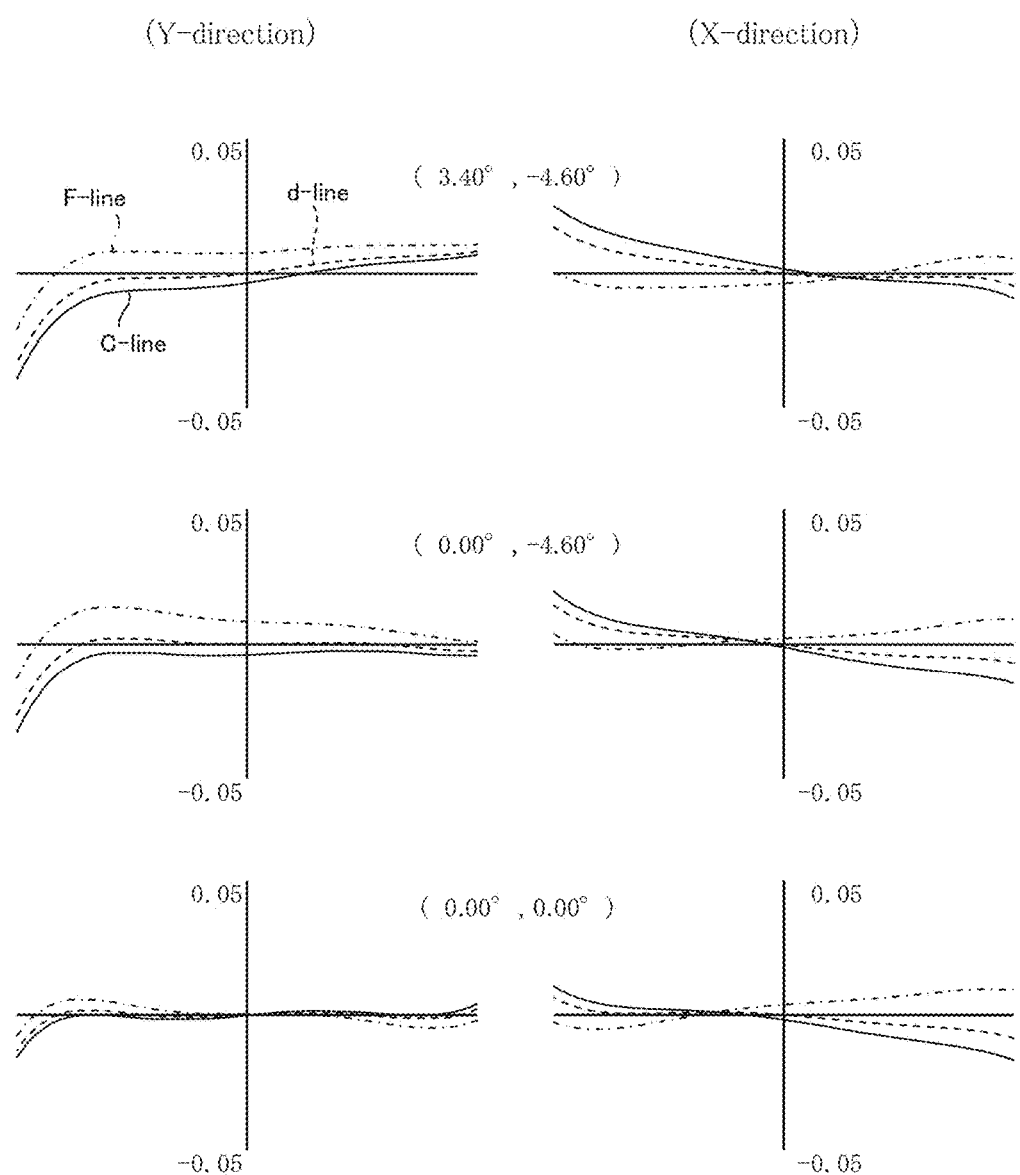
FIG. 12 is a set of transverse aberration diagrams for the whole prism optical system of Example 3 according to one embodiment.
Figure 13:
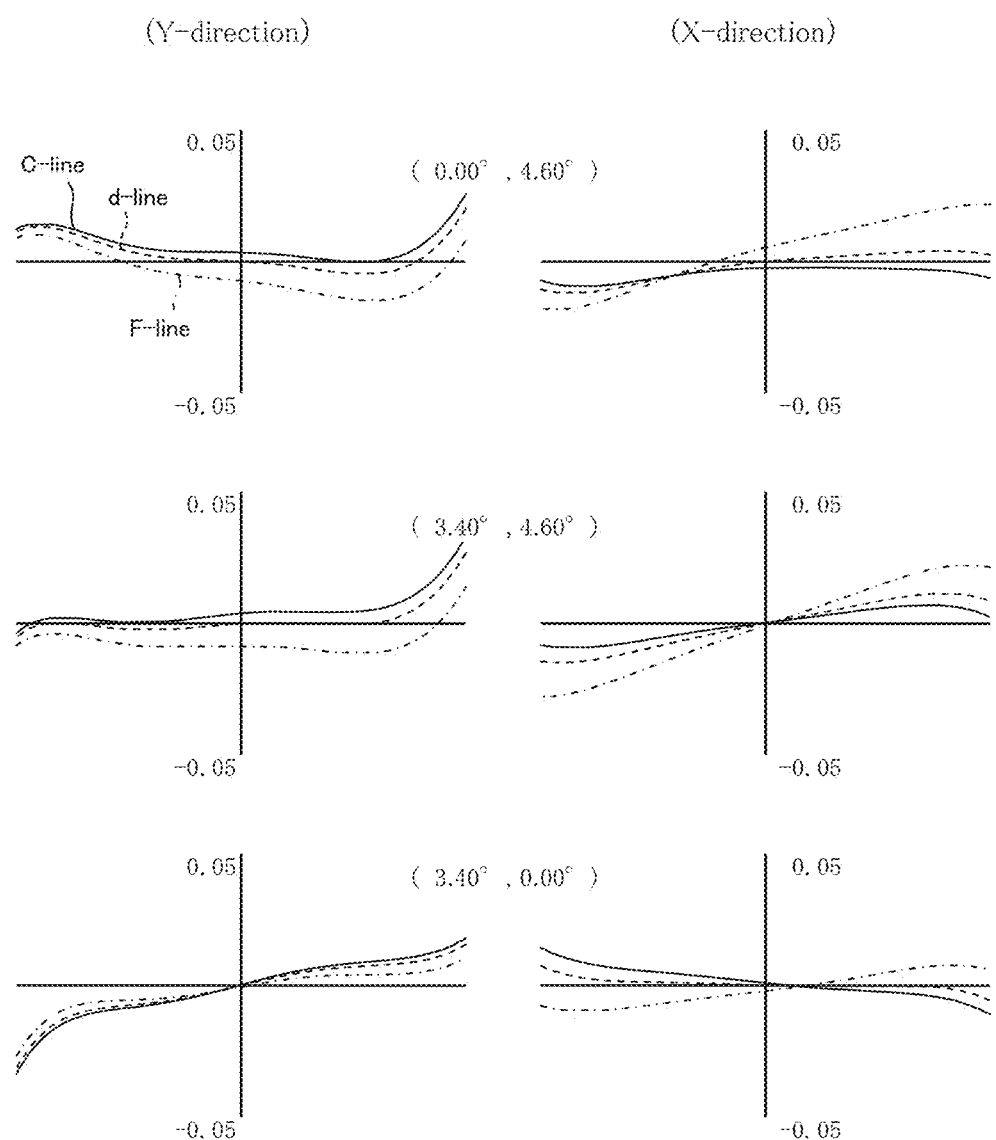
FIG. 13 is a set of transverse aberration diagrams for the whole prism optical system of Example 3 according to one embodiment.

FIG. 10 is an optical path diagram in the Y-Z section for the prism optical system of Example 3 according to one embodiment. FIG. 11 is an optical path diagram in the X-Z section for the prism optical system of Example 3 according to one embodiment. FIGS. 12 and 13 are sets of transverse aberration diagrams for the whole prism optical system of Example 3 according to one embodiment.

The prism optical system of Example 3 includes an optical element 10 having a first surface 11 that is a transmitting surface as an entrance surface in back ray tracing and an internal reflecting surface as well, a second surface 12 that is an internal reflecting surface in opposition to the first surface 11, a third surface 13 that is an internal reflecting surface in opposition to the first surface 11 and adjacent to the second surface 12, a fourth surface 14 that is an internal reflecting surface in opposition to the first surface 11 and adjacent to the third surface 13 and makes up a reflecting surface closest to the image plane, and a fifth surface 15 that is a transmitting surface adjacent to the first surface 11 and in opposition to the fourth surface 14.

The free-form surface is applied to the first 11, second 12, third 13, and fourth surface 14 as the rotationally asymmetric surface.

In the case of the imaging system, a light beam enters the optical element 10 through the first surface 11, is internally reflected off the second surface 12, off the first surface 11, off the third surface 13, off the first surface 11 and off the fourth surface 14, and exits out of the prism optical system 1 through the fifth surface 15, forming an image on the image plane Im.

In back ray tracing in the case of the display system, a light beam enters the optical element 10 through the fifth surface 15, is internally reflected off the fourth surface 14, off the first surface 11, off the third surface 13, off the first surface 11 and off the second surface 12, and exits out of the prism optical system 1 through the first surface 11.

Figure 14:
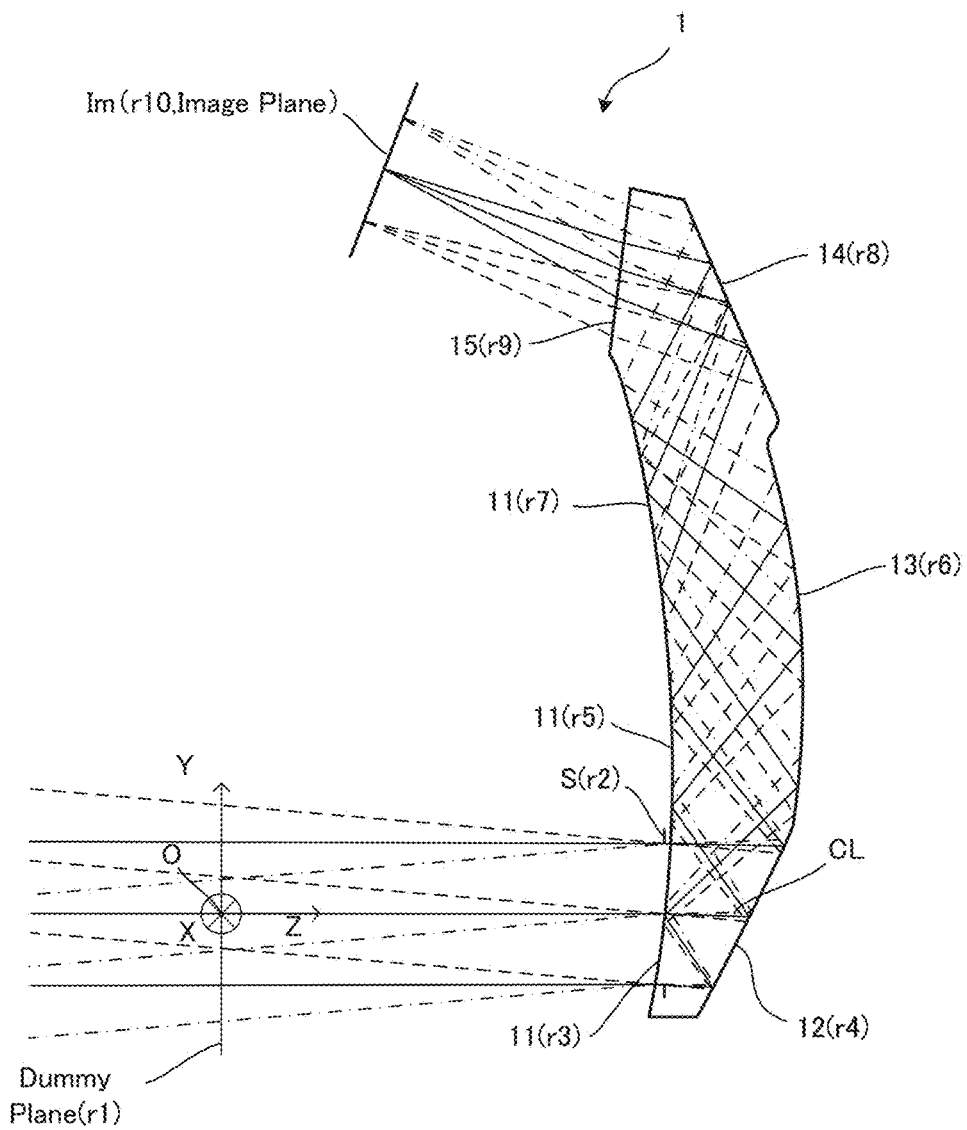
FIG. 14 is an optical path diagram in the Y-Z section for the prism optical system of Example 4 according to one embodiment.
Figure 15:
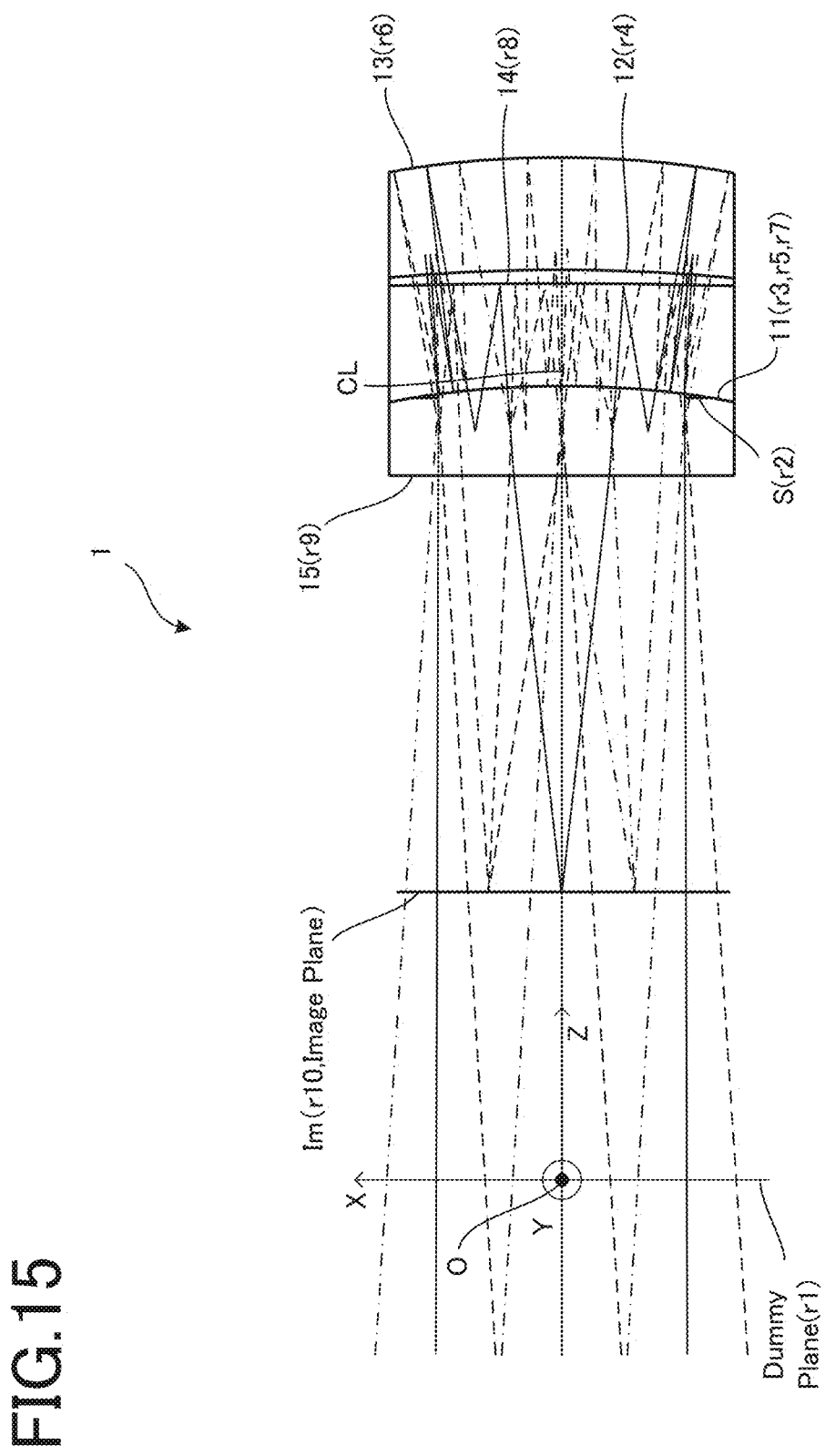
FIG. 15 is an optical path diagram in the X-Z section for the prism optical system of Example 4 according to one embodiment.
Figure 16:
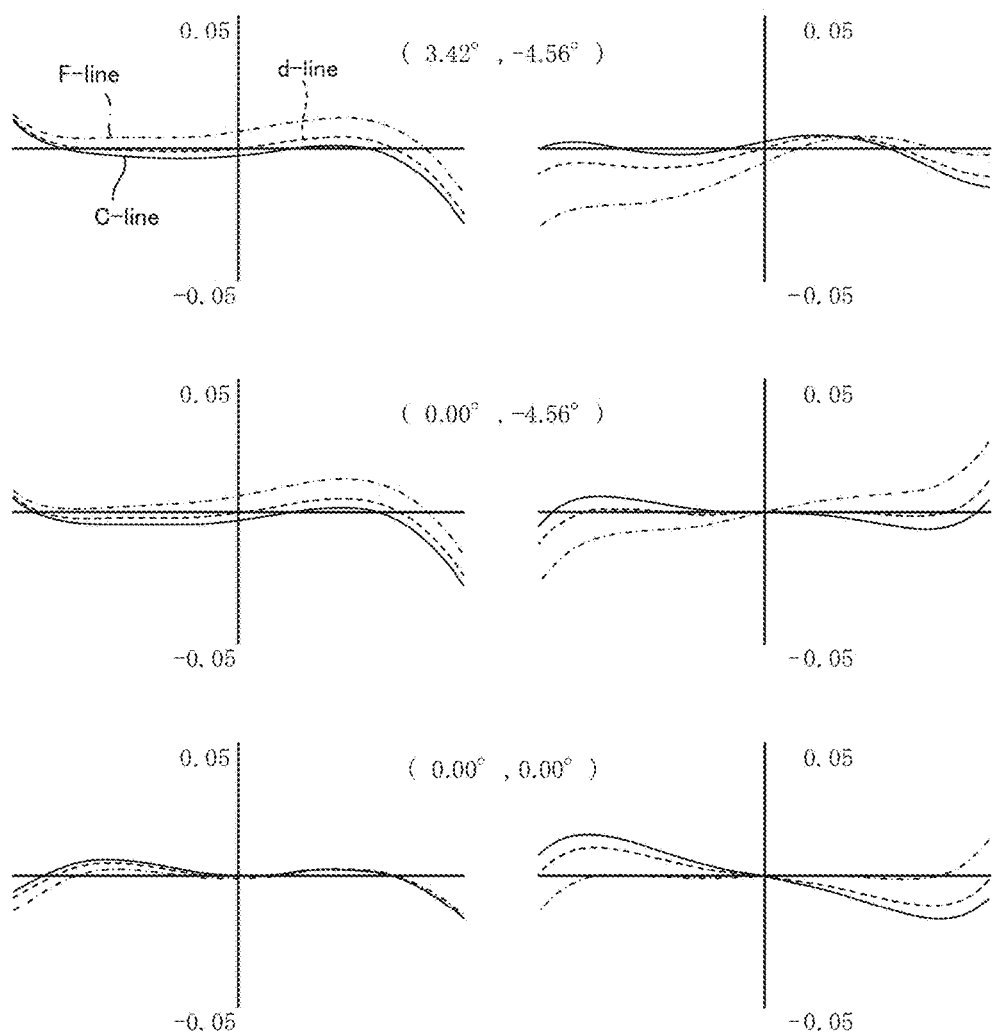
FIG. 16 is a set of transverse aberration diagrams for the whole prism optical system of Example 4 according to one embodiment.
Figure 17:
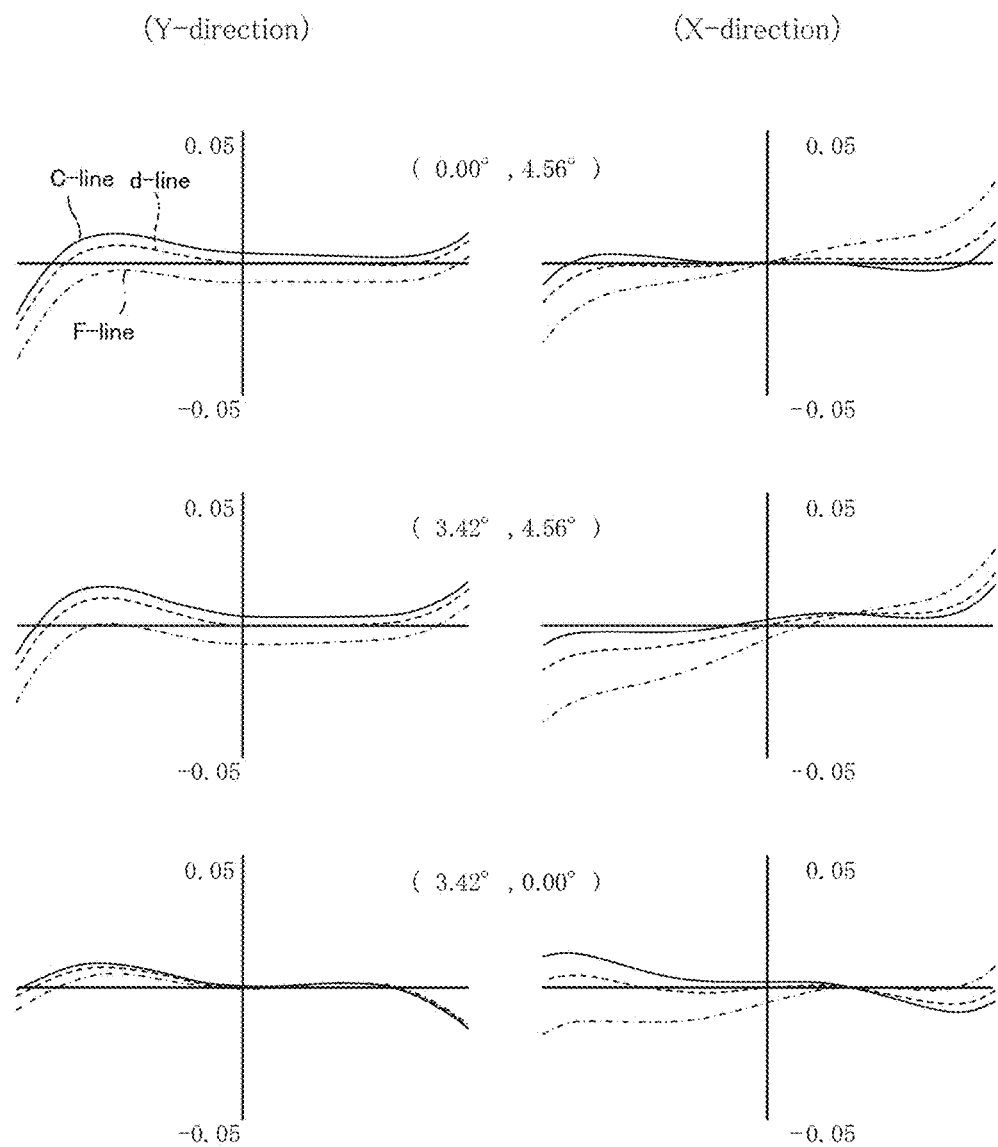
FIG. 17 is a set of transverse aberration diagrams for the whole prism optical system of Example 4 according to one embodiment.

FIG. 14 is an optical path diagram in the Y-Z section for the prism optical system of Example 4 according to one embodiment. FIG. 15 is an optical path diagram in the X-Z section for the prism optical system of Example 4 according to one embodiment. FIGS. 16 and 17 are sets of transverse aberration diagrams for the whole prism optical system of Example 4 according to one embodiment.

The prism optical system of Example 4 includes an optical element 10 having a first surface 11 that is a transmitting surface as an entrance surface in back ray tracing and an internal reflecting surface as well, a second surface 12 that is an internal reflecting surface in opposition to the first surface 11, a third surface 13 that is an internal reflecting surface in opposition to the first surface 11 and adjacent to the second surface 12, a fourth surface 14 that is an internal reflecting surface in opposition to the first surface 11 and adjacent to the third surface 13 and makes up a reflecting surface closest to the image plane, and a fifth surface 15 that is a transmitting surface adjacent to the first surface 11 and in opposition to the fourth surface 14.

The free-form surface is applied to the first 11, second 12, third 13, and fourth surface 14 as the rotationally asymmetric surface.

In the case of the imaging system, a light beam enters the optical element 10 through the first surface 11, is internally reflected off the second surface 12, off the first surface 11, off the third surface 13, off the first surface 11 and off the fourth surface 14, and exits out of the prism optical system 1 through the fifth surface 15, forming an image on the image plane Im.

In back ray tracing in the case of the display system, a light beam enters the optical element 10 through the fifth surface 15, is internally reflected off the fourth surface 14, off the first surface 11, off the third surface 13, off the first surface 11 and off the second surface 12, and exits out of the prism optical system 1 through the first surface 11.

In what follows, setup parameters in the Examples 1, 2, 3 and 4 will be shown. Note here that "FFS" in the following tables is an abbreviation of the free-form surface.

Example 1

| Surface No. | Radius of Curvature | Surface Separation | Decentration | Refractive Index | Abbe Constant |
|---|---|---|---|---|---|
| Object Surface | ∞ | −1000.00 | | | |
| 1 | ∞ (Dummy Place) | 0.00 | | | |
| 2 | Stop Surface | 0.00 | Decentration (1) | | |
| 3 | FFS [1] | 0.00 | Decentration (2) | 1.5254 | 56.2 |
| 4 | FFS [2] | 0.00 | Decentration (3) | 1.5254 | 56.2 |
| 5 | FFS [1] | 0.00 | Decentration (2) | 1.5254 | 56.2 |
| 6 | FFS [3] | 0.00 | Decentration (4) | 1.5254 | 56.2 |
| 7 | FFS [1] | 0.00 | Decentration (2) | 1.5254 | 56.2 |
| 8 | FFS [4] | 0.00 | Decentration (5) | 1.5254 | 56.2 |
| 9 | ∞ | 0.00 | Decentration (6) | | |
| 10 | ∞ | 0.00 | Decentration (7) | | |
| Image Plane | ∞ | 0.00 | | | |

| FFS [1] | | | | | |
|---|---|---|---|---|---|
| C 4 | −4.3281e−002 | C 6 | −1.5662e−001 | C 8 | 6.8174e−003 |
| C 10 | −1.1761e−003 | C 11 | −4.8076e−004 | C 13 | −8.1235e−004 |
| C 15 | 4.7909e−004 | C 17 | 1.1573e−004 | C 19 | 3.0998e−005 |
| C 21 | 4.7949e−006 | C 22 | 3.6016e−007 | C 24 | −8.7227e−006 |
| C 26 | −1.9086e−006 | C 28 | −3.4639e−006 | | |

| FFS [2] | | | | | |
|---|---|---|---|---|---|
| C 4 | −1.2484e−002 | C 6 | −1.1577e−002 | C 8 | −7.2834e−005 |
| C 10 | −4.0446e−005 | C 11 | −1.2599e−005 | C 13 | 1.2521e−007 |
| C 15 | 2.0398e−006 | | | | |

| FFS [3] | | | | | |
|---|---|---|---|---|---|
| C 4 | −1.1545e−002 | C 6 | −9.0290e−003 | C 8 | 3.5115e−004 |
| C 10 | 2.3751e−004 | C 11 | −3.1467e−005 | C 13 | 2.1809e−005 |
| C 15 | 8.3907e−006 | C 17 | −3.9784e−007 | C 19 | 1.5985e−006 |
| C 21 | 4.3226e−007 | | | | |

-continued

| FFS [4] | | | | | |
|---|---|---|---|---|---|
| C 4 | −3.9660e−003 | C 6 | 4.6220e−003 | C 8 | −2.5575e−004 |
| C 10 | 1.0111e−004 | C 11 | −1.0411e−005 | C 13 | 5.8183e−006 |
| C 15 | −2.4468e−005 | C 17 | −2.1875e−006 | C 19 | −4.6611e−006 |
| C 21 | −2.7422e−006 | | | | |

| Decentration [1] | | | | | |
|---|---|---|---|---|---|
| X | 0.00 | Y | 0.00 | Z | 18.00 |
| α | 0.00 | β | 0.00 | γ | 0.00 |
| Decentration [2] | | | | | |
| X | 0.00 | Y | −11.14 | Z | 14.74 |
| α | −64.85 | β | 0.00 | γ | 0.00 |
| Decentration [3] | | | | | |
| X | 0.00 | Y | −5.42 | Z | 19.13 |
| α | −29.33 | β | 0.00 | γ | 0.00 |
| Decentration [4] | | | | | |
| X | 0.00 | Y | 13.92 | Z | 21.29 |
| α | 14.57 | β | 0.00 | γ | 0.00 |
| Decentration [5] | | | | | |
| X | 0.00 | Y | 20.17 | Z | 18.84 |
| α | 20.16 | β | 0.00 | γ | 0.00 |
| Decentration [6] | | | | | |
| X | 0.00 | Y | 21.81 | Z | 15.03 |
| α | −29.68 | β | 0.00 | γ | 0.00 |
| Decentration [7] | | | | | |
| X | 0.00 | Y | 22.63 | Z | 12.79 |
| α | −20.00 | β | 0.00 | γ | 0.00 |

Example 2

| Surface No. | Radius of Curvature | Surface Separation | Decentration | Refractive Index | Abbe Constant |
|---|---|---|---|---|---|
| Object Surface | ∞ | −1000.00 | | | |
| 1 | ∞ (Dummy Place) | 0.00 | | | |
| 2 | Stop Surface | 0.00 | Decentration (1) | | |
| 3 | FFS[1] | 0.00 | Decentration (2) | 1.5254 | 56.2 |
| 4 | FFS[2] | 0.00 | Decentration (3) | 1.5254 | 56.2 |
| 5 | FFS[1] | 0.00 | Decentration (2) | 1.5254 | 56.2 |
| 6 | FFS[3] | 0.00 | Decentration (4) | 1.5254 | 56.2 |
| 7 | FFS[1] | 0.00 | Decentration (2) | 1.5254 | 56.2 |
| 8 | FFS[4] | 0.00 | Decentration (5) | 1.5254 | 56.2 |
| 9 | ∞ | 0.00 | Decentration (6) | | |
| 10 | ∞ | 0.00 | Decentration (7) | | |
| Image Plane | ∞ | 0.00 | | | |

| FFS [1] | | | | | |
|---|---|---|---|---|---|
| C 4 | −1.8441e−002 | C 6 | −1.1201e−002 | C 8 | 8.3033e−004 |
| C 10 | 5.4819e−004 | C 11 | −1.8981e−005 | C 13 | −4.5693e−005 |
| C 15 | −4.7393e−005 | C 17 | −2.8595e−007 | C 19 | 2.0649e−006 |
| C 21 | 2.0130e−006 | C 22 | 1.3939e−007 | C 24 | 8.0133e−008 |
| C 26 | −2.5868e−008 | C 28 | −3.4775e−008 | | | |
| FFS [2] | | | | | |
| C 4 | −1.1002e−002 | C 6 | −3.0220e−003 | C 8 | 3.2404e−004 |
| C 10 | −8.8065e−005 | C 11 | −3.7848e−006 | C 13 | −8.4278e−006 |
| C 15 | 3.7775e−007 | | | | |
| FFS [3] | | | | | |
| C 4 | −1.8532e−002 | C 6 | −1.4244e−002 | C 8 | 4.5530e−004 |
| C 10 | 1.3328e−004 | C 11 | −1.1385e−005 | C 13 | −1.8310e−005 |
| C 15 | −1.2761e−005 | C 17 | 6.5322e−007 | C 19 | 6.7078e−007 |
| C 21 | 6.4319e−008 | | | | |
| FFS [4] | | | | | |
| C 4 | −5.9883e−004 | C 6 | 3.1193e−004 | C 8 | 2.3311e−004 |
| C 10 | 1.7427e−005 | C 11 | −7.2186e−007 | C 13 | 2.0729e−005 |
| C 15 | −2.2180e−006 | C 17 | 1.4516e−006 | C 19 | −1.3306e−007 |
| C 21 | −9.4438e−007 | | | | |

| Decentration [1] | | | | | |
|---|---|---|---|---|---|
| X | 0.00 | Y | 10.15 | Z | 20.00 |
| α | 0.00 | β | 0.00 | γ | 0.00 |
| Decentration [2] | | | | | |
| X | 0.00 | Y | 8.89 | Z | 20.04 |
| α | 0.95 | β | 0.00 | γ | 0.00 |
| Decentration [3] | | | | | |
| X | 0.00 | Y | 4.92 | Z | 21.83 |
| α | −22.85 | β | 0.00 | γ | 0.00 |
| Decentration [4] | | | | | |
| X | 0.00 | Y | 16.56 | Z | 25.14 |
| α | 3.87 | β | 0.00 | γ | 0.00 |
| Decentration [5] | | | | | |
| X | 0.00 | Y | 32.45 | Z | 20.50 |
| α | 21.95 | β | 0.00 | γ | 0.00 |
| Decentration [6] | | | | | |
| X | 0.00 | Y | 35.15 | Z | 14.00 |
| α | −27.47 | β | 0.00 | γ | 0.00 |
| Decentration [7] | | | | | |
| X | 0.00 | Y | 38.86 | Z | 3.82 |
| α | −20.00 | β | 0.00 | γ | 0.00 |

Example 3

| Surface No. | Radius of Curvature | Surface Separation | Decentration | Refractive Index | Abbe Constant |
|---|---|---|---|---|---|
| Object Surface | ∞ | −1000.00 | | | |
| 1 | ∞ (Dummy Place) | 0.00 | | | |
| 2 | Stop Surface | 0.00 | Decentration (1) | | |
| 3 | FFS [1] | 0.00 | Decentration (2) | 1.5254 | 56.2 |
| 4 | FFS [2] | 0.00 | Decentration (3) | 1.5254 | 56.2 |
| 5 | FFS [1] | 0.00 | Decentration (2) | 1.5254 | 56.2 |
| 6 | FFS [3] | 0.00 | Decentration (4) | 1.5254 | 56.2 |
| 7 | FFS [1] | 0.00 | Decentration (2) | 1.5254 | 56.2 |
| 8 | FFS [4] | 0.00 | Decentration (5) | 1.5254 | 56.2 |
| 9 | ∞ | 0.00 | Decentration (6) | | |
| 10 | ∞ | 0.00 | Decentration (7) | | |
| Image Plane | ∞ | 0.00 | | | |

| FFS [1] | | | | | |
|---|---|---|---|---|---|
| C 4 | −2.2853e−002 | C 5 | −1.7050e−003 | C 6 | 2.5968e−003 |
| C 7 | −4.6064e−005 | C 8 | 3.4217e−004 | C 9 | 7.8387e−005 |
| C 10 | 2.2531e−004 | C 11 | −2.7281e−005 | C 12 | −1.4220e−005 |
| C 13 | 1.7186e−005 | C 14 | 4.4297e−006 | C 15 | −3.9147e−005 |
| C 16 | −7.6072e−007 | C 17 | 2.2808e−007 | C 18 | 1.9559e−006 |
| C 19 | −8.5698e−007 | C 20 | −4.1911e−008 | C 21 | 1.5100e−006 |
| C 22 | 1.9476e−007 | C 23 | 2.3761e−008 | C 24 | 9.0444e−008 |
| C 25 | −5.1442e−008 | C 26 | 8.4923e−009 | C 27 | −1.5955e−010 |
| C 28 | −1.9539e−008 | | | | |
| FFS [2] | | | | | |
| C 4 | −1.1688e−002 | C 5 | −6.0364e−004 | C 6 | 1.2232e−003 |
| C 7 | −4.2456e−005 | C 8 | 3.3290e−004 | C 9 | 9.7235e−005 |

-continued

| C 10 | −4.5317e−004 | C 11 | −4.7710e−006 | C 12 | 5.6142e−006 |
| C 13 | −1.2120e−005 | C 14 | −5.6772e−006 | C 15 | 1.9824e−005 |
| C 67 | 1.4000e+001 | | | | |

FFS [3]

| C 4 | −2.0389e−002 | C 6 | −5.7908e−003 | C 8 | 2.8410e−004 |
| C 10 | 1.3862e−006 | C 11 | −8.2994e−006 | C 13 | −8.8314e−006 |
| C 15 | −1.3995e−005 | C 17 | 1.3031e−006 | C 19 | −2.8655e−008 |
| C 21 | 3.2629e−007 | | | | |

FFS [4]

| C 4 | −1.2582e−003 | C 6 | 3.9997e−005 | C 8 | 2.3346e−005 |
| C 10 | −1.5353e−005 | C 11 | 1.1285e−005 | C 13 | 8.2584e−006 |
| C 15 | −1.7561e−005 | C 17 | 1.4387e−006 | C 19 | 1.7918e−006 |
| C 21 | −2.6767e−006 | | | | |

Decentration [1]

| X | 0.00 | Y | 0.00 | Z | 18.00 |
| α | 0.00 | β | 0.00 | γ | 0.00 |

Decentration [2]

| X | 0.00 | Y | −3.14 | Z | 18.16 |
| α | 3.35 | β | 0.00 | γ | 0.00 |

Decentration [3]

| X | 0.00 | Y | −0.99 | Z | 22.09 |
| α | −23.97 | β | 0.00 | γ | 0.00 |

Decentration [4]

| X | 0.00 | Y | 9.45 | Z | 25.04 |
| α | 2.33 | β | 0.00 | γ | 0.00 |

Decentration [5]

| X | 0.00 | Y | 28.24 | Z | 21.28 |
| α | 17.59 | β | 7.50 | γ | 0.00 |

Decentration [6]

| X | −0.00 | Y | 30.51 | Z | 15.92 |
| α | −27.65 | β | 7.78 | γ | 0.00 |

Decentration [7]

| X | 3.63 | Y | 32.98 | Z | 8.95 |
| α | −19.66 | β | 15.00 | γ | 0.00 |

Example 3

| Surface No. | Radius of Curvature | Surface Separation | Decentration | Refractive Index | Abbe Constant |
|---|---|---|---|---|---|
| Object Surface | ∞ | −1000.00 | | | |
| 1 | ∞ (Dummy Place) | 0.00 | | | |
| 2 | Stop Surface | 0.00 | Decentration (1) | | |
| 3 | FFS [1] | 0.00 | Decentration (2) | 1.5254 | 56.2 |
| 4 | FFS [2] | 0.00 | Decentration (3) | 1.5254 | 56.2 |
| 5 | FFS [1] | 0.00 | Decentration (2) | 1.5254 | 56.2 |
| 6 | FFS [3] | 0.00 | Decentration (4) | 1.5254 | 56.2 |
| 7 | FFS [1] | 0.00 | Decentration (2) | 1.5254 | 56.2 |
| 8 | FFS [4] | 0.00 | Decentration (5) | 1.5254 | 56.2 |
| 9 | ∞ | 0.00 | Decentration (6) | | |
| 10 | ∞ | 0.00 | Decentration (7) | | |
| Image Plane | ∞ | 0.00 | | | |

FFS [1]

| C 4 | −2.5090e−002 | C 6 | −8.0772e−003 | C 8 | 2.9246e−005 |
| C 10 | 1.5015e−004 | C 11 | −2.7040e−005 | C 13 | 1.5308e−005 |
| C 15 | −3.2743e−005 | C 17 | −2.2363e−006 | C 19 | 3.6280e−006 |
| C 21 | 2.1096e−006 | C 22 | −6.2216e−007 | C 24 | 1.2171e−007 |
| C 26 | −8.7547e−008 | C 28 | −4.4421e−008 | | |

-continued

FFS [2]

| C 4 | −1.2220e−002 | C 6 | −3.8031e−003 | C 8 | −2.2865e−004 |
| C 10 | −9.3444e−005 | C 11 | −6.0363e−006 | C 13 | 4.0767e−005 |
| C 15 | 2.6887e−007 | | | | |

FFS [3]

| C 4 | −2.1803e−002 | C 6 | −1.2545e−002 | C 8 | 5.7296e−004 |
| C 10 | −2.6707e−005 | C 11 | −2.6378e−005 | C 13 | 3.7023e−006 |
| C 15 | −1.2935e−005 | C 17 | 5.5970e−007 | C 19 | 9.2851e−007 |
| C 21 | 2.2525e−007 | | | | |

FFS [4]

| C 4 | 3.1831e−004 | C 6 | 2.1846e−004 | C 8 | 1.0967e−003 |
| C 10 | 1.5005e−004 | C 11 | 2.8884e−005 | C 13 | 7.7663e−005 |
| C 15 | −7.0772e−006 | C 17 | 9.7584e−007 | C 19 | −3.3929e−006 |
| C 21 | −2.6463e−006 | C 22 | −3.9874e−006 | C 24 | −8.2805e−007 |
| C 26 | −7.4351e−007 | C 28 | −1.2296e−007 | | |

Decentration [1]

| X | 0.00 | Y | 0.00 | Z | 18.00 |
| α | 0.00 | β | 0.00 | γ | 0.00 |

Decentration [2]

| X | 0.00 | Y | 1.83 | Z | 18.17 |
| α | −4.28 | β | 0.00 | γ | 0.00 |

Decentration [3]

| X | 0.00 | Y | −1.75 | Z | 20.95 |
| α | −28.66 | β | 0.00 | γ | 0.00 |

Decentration [4]

| X | 0.00 | Y | 10.46 | Z | 24.17 |
| α | 1.52 | β | 0.00 | γ | 0.00 |

Decentration [5]

| X | 0.00 | Y | 26.30 | Z | 20.87 |
| α | 24.44 | β | 0.00 | γ | 0.00 |

Decentration [6]

| X | 0.00 | Y | 27.76 | Z | 16.04 |
| α | −7.21 | β | 0.00 | γ | 0.00 |

Decentration [7]

| X | 0.00 | Y | 32.07 | Z | 5.35 |
| α | −22.00 | β | 0.00 | γ | 0.00 |

The values corresponding to Condition (1) in Examples 1, 2 and 3 are set out in Table 1 given below.

TABLE 1

| | x | y | cx | cy | cy/cx |
|---|---|---|---|---|---|
| Ex. 1 | 0 | 0 | −0.007932 | 0.009244 | −1.165 |
| Ex. 2 | 0 | 0 | −0.001198 | 0.000624 | −0.521 |
| Ex. 3 | 0.3402 | 0 | −0.002501 | 0.000082 | −0.033 |

Figure 18:
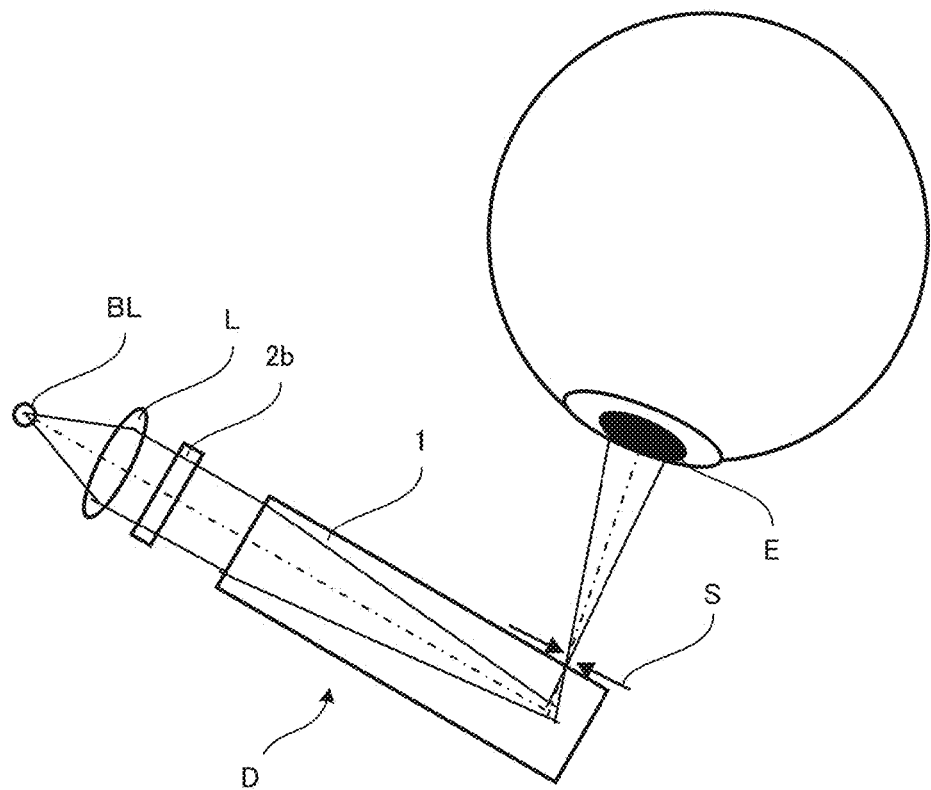
FIG. 18 is illustrative in fundamental arrangement of an image display apparatus that incorporates a prism optical system.

FIG. 18 is illustrative of the fundamental arrangement of the image display apparatus D that incorporates the prism optical system 1.

By use of the prism optical system 1 and image display device 2b, the image display apparatus D as described herein can be reduced in terms of both size and weight, and allows the wearer to look objectively normal.

In the image display apparatus D as described here, a liquid crystal display device is used as the image display device 2b for which a backlight BL must be used as a light source. In the embodiment here, a lighting lens L is interposed between the backlight BL and the image display device 2.

In the thus set-up image display apparatus D, image light exiting out of the image display device 2 is bent by the prism optical system 1 having a positive power toward the eyeballs so that the viewer can view images as virtual images.

If the vicinity of an exit portion is allowed to function just like an aperture stop S, it is then possible to view images even when the prism itself is slimmed down.

Further, when the image display device 2b is of the liquid crystal type, the backlight BL is required, so it is desired in view of lighting efficiency that an image from the light source be positioned in the vicinity of an exit window.

Preferably, a center chief ray exiting out of the image display apparatus D is positioned in such a way as to lie somewhat outside the frontal direction with respect to the eyeballs. This will prevent the display screen or reflecting portion from blocking off the front of the field of view, and make the optical path shorter thereby rendering the prism optical system 1 more compact.

Figure 19:
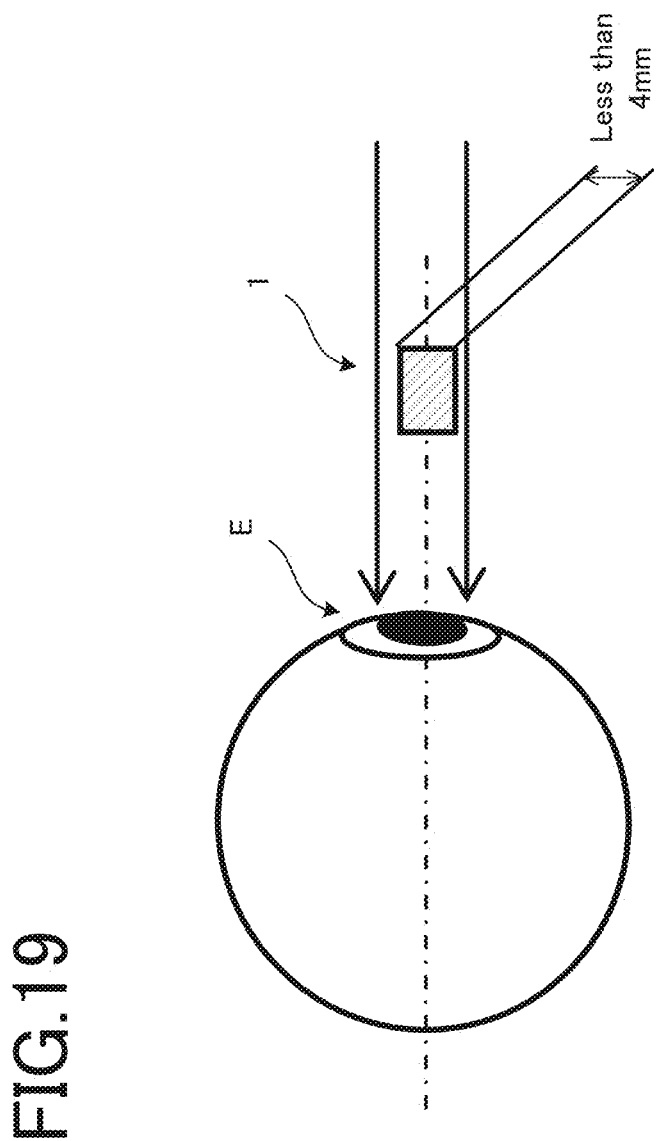
FIG. 19 is a side view of the image display apparatus incorporating a prism optical system.

FIG. 19 is a side view of the image display apparatus D that incorporates the prism optical system 1.

As shown in FIG. 19, the width of a portion in the vertical direction of the prism optical system 1 in opposition to the pupil E of the viewer is set to less than 4 mm that is a human's average pupil diameter. It is then possible to cast scenes in the rear of the prism optical system 1 onto the pupil E of the viewer from above and below the prism optical system 1, that is, to achieve the see-through effect.

Figure 20:
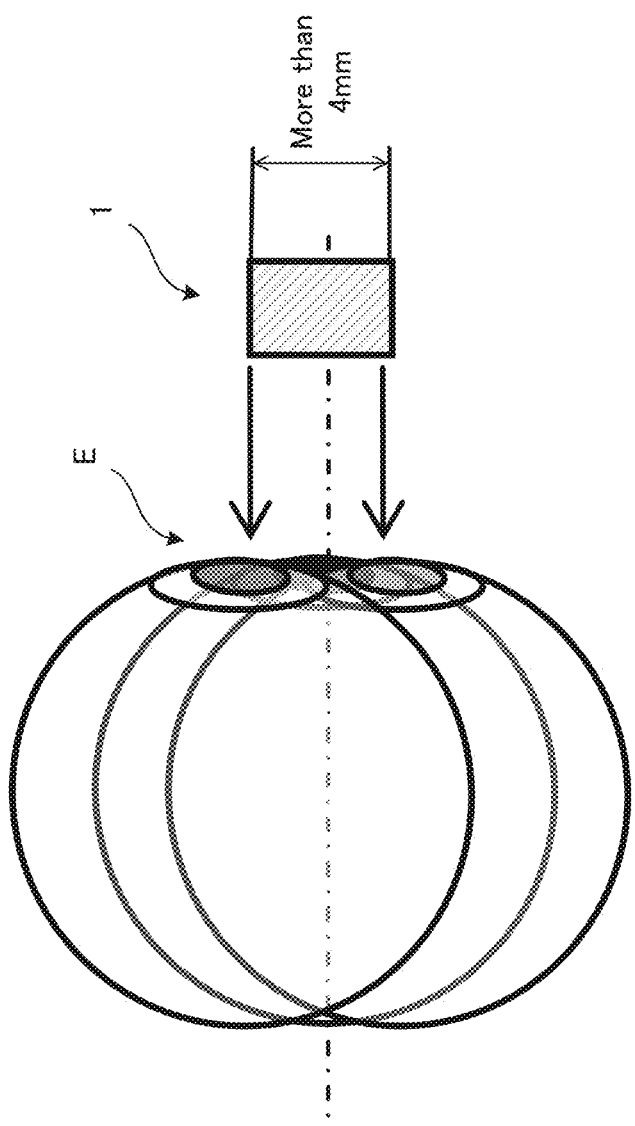
FIG. 20 is a side view of another example of the image display apparatus incorporating a prism optical system.

FIG. 20 is a side view of another example of the image display apparatus D that incorporates the prism optical system 1.

As shown in FIG. 20, the width of a portion in the vertical direction of the prism optical system 1 in opposition to the pupil E of the viewer is set to greater than 4 mm. It is then possible to make use of an increased height thereby rendering tolerance for vertical shifting higher.

Figure 21:
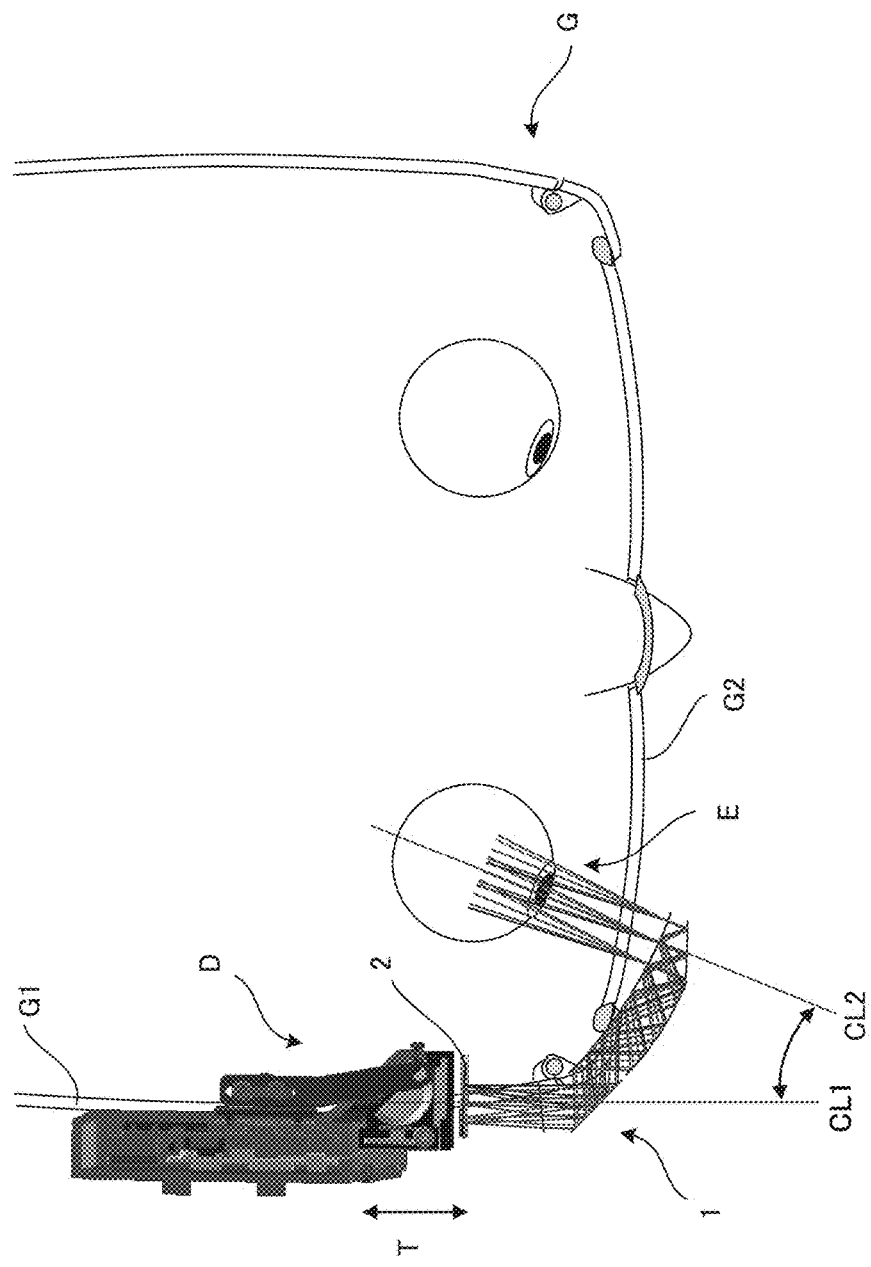
FIG. 21 is illustrative of a head-mounted type image display apparatus incorporating a prism optical system.
Figure 22:
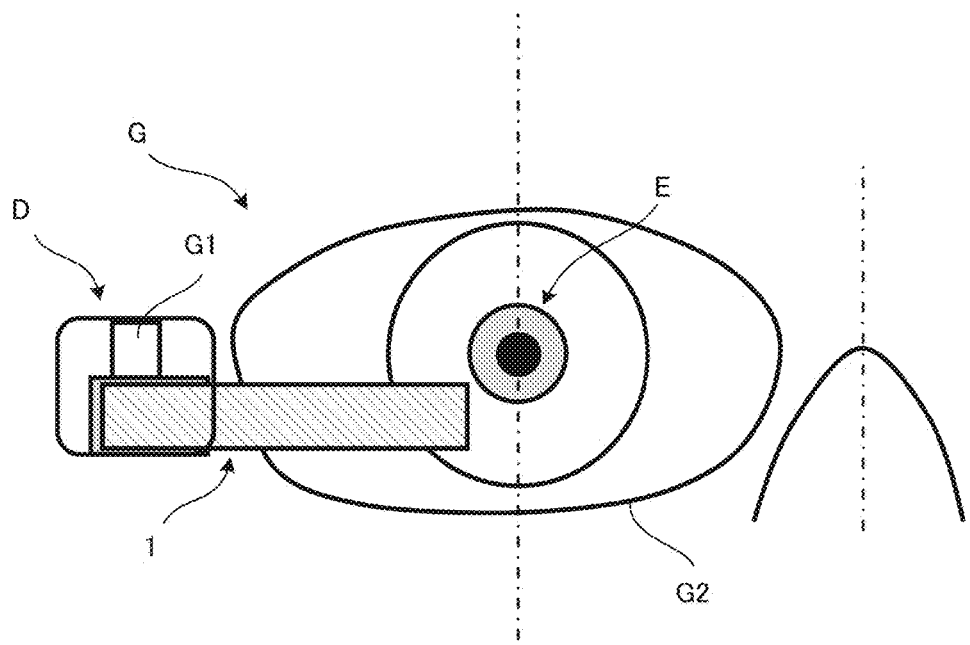
FIG. 22 is a front view of the head-mounted type image display apparatus incorporating a prism optical system.

FIG. 21 is illustrative of a head-mounted type image display apparatus D that incorporates the prism optical system 1, and FIG. 22 is a front view of the head-mounted type image display apparatus D that incorporates the prism optical system 1.

The image display apparatus D here makes it possible to view an external world and electronic images at the same time without disturbing the field of view for external worlds (the see-through function) while it can be reduced in terms of both size and weight.

As shown in FIG. 21, the prism optical system 1 may be mounted on eyeglasses G. Image light exiting out of the frontally oriented image display device 2b is directed through the prism optical system 1 toward the pupil. The prism optical system 1 has a positive power enough to enlarge an image from the image display device 2b so that wearer can view it as a virtual image. If the image display device 2b is moved back and forth along the direction (indicated by an arrow T) substantially along a temple portion G1, it is then possible to adjust it in conformity with the diopter of the viewer. Note here that the angle between the first center chief ray CL1 exiting out of the center of the image display device 2b and the second center chief ray CL2 exiting out of the prism and arriving at the center of the viewer's pupil is preferably 0° to 40°.

In the image display apparatus D of FIG. 1 upon frontally viewed as shown in FIG. 22, the prism optical system 1 is located in opposition to the viewer's pupil E so that an enlarged virtual image can be presented to the viewer.

The prism optical system 1 here is used with the imaging device 2a instead of the image display device 2b, so it is possible to provide an imaging apparatus that can be reduced in terms of size, weight and cost.

Figure 23:
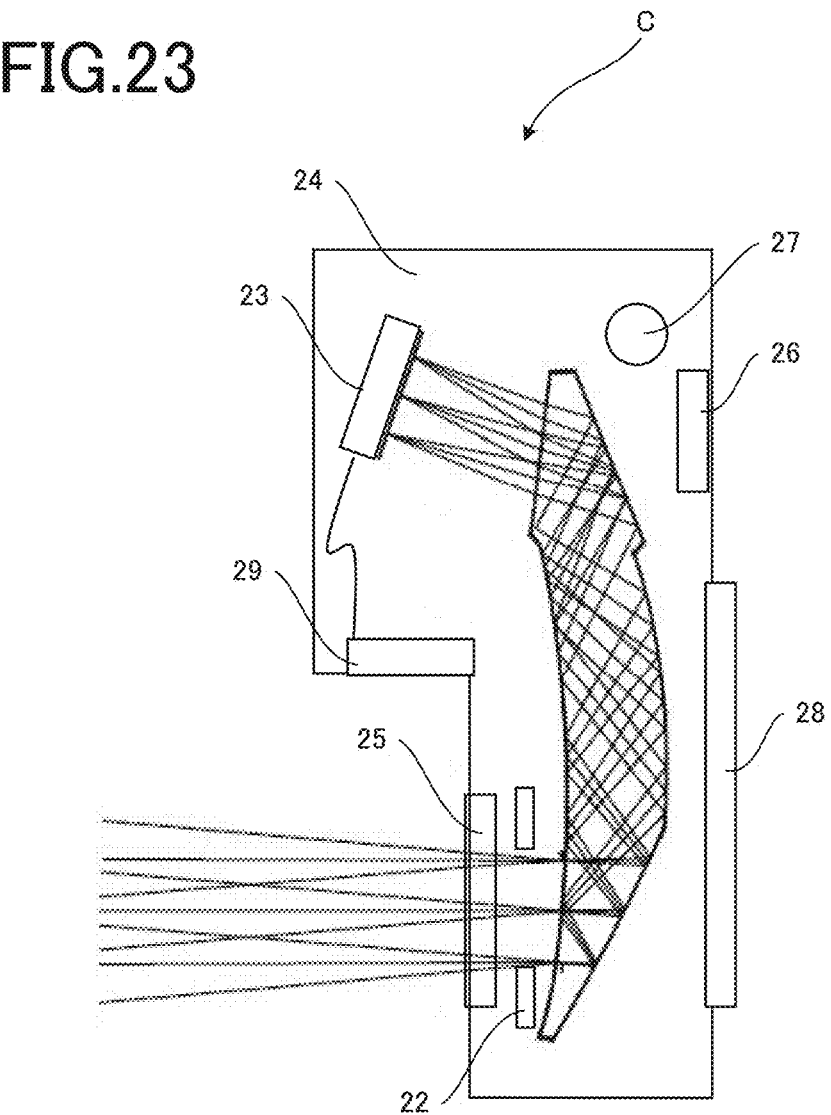
FIG. 23 is illustrative in conception of an imaging apparatus or digital camera to which the prism optical system according to one embodiment is applied.

FIG. 23 is illustrative in conception of the imaging system C or digital camera to which the prism optical system 1 here is applied.

When the prism optical system 1 is applied to the imaging apparatus C, the exit pupil of the image display apparatus acts as an entrance pupil, near which an aperture stop 22 is provided. The aperture of this stop is expanded or contracted for brightness adjustment. Further, an imaging device 23 is located instead of the display device.

A camera body 24 is provided with an entrance window 25 adapted to take in light and prevent contamination of its interior, a switch 26, a shutter 27, and a back panel 28 adapted to check up operatios and imaging. As the shutter 27 is pressed down with the switch 26 held on, it causes a shutter (not shown) annexed to the imaging device 23 to be put in actuation to take still images for a time set at shutter speed in an imaging device (CCD) 23 and store image data in an image recording memory 29. Moving images may be taken as is the case with still images, but with the shutter released open, they are captured in the imaging device 23 and accumulated in the memory.

REFERENCE SIGNS LIST

1: Prism Optical System
2a: Imaging Device
2b: Image Display Device
C: Imaging Apparatus
D: Image Display Apparatus

The invention claimed is:
1. A prism optical system comprising:
an optical element that includes at least five optical surfaces, each having an optical action, wherein at least three out of the at least five optical surfaces are rotationally asymmetric surfaces and one of two surfaces on which light is incident or out of which light exits has one transmission and at least one internal reflection;
in a light ray traveling from an entrance pupil toward an image plane through the optical element, at least a portion of a reflecting surface closest to the image plane along an optical path has a negative power;
the optical element comprises, in order along a path taken by light that enters and exits out of the optical element,
a first surface that defines a transmitting surface as an entrance surface and an internal reflecting surface as well,
a second surface that defines an internal reflecting surface in opposition to the first surface,
a third surface that defines an internal reflecting surface in opposition to the first surface and adjacent to the second surface,
a fourth surface that defines an internal reflecting surface in opposition to the first surface and adjacent to the third surface and an internal reflecting surface closest to the image plane as well, and
a fifth surface that defines a transmitting surface adjacent to the first surface and in opposition to the fourth surface; and
given that a Z-axis positive direction is defined by a direction along a direction of travel of a center chief ray, perpendicular to a plane that defines the entrance pupil, from one point included in a dummy plane that is an origin through the center of the entrance pupil, a Y-Z plane is defined by a plane including the Z-axis and the center of the image plane, and a Y-axis positive direction comes close to a direction from the origin toward the center of the image plane, and an X-axis positive direction is defined by a direction that forms a right-handed orthogonal coordinate system with the Y-axis and the Z-axis, the fourth surface is defined by a rotationally asymmetric surface having a negative power in the Y-Z plane and a positive power in the X-direction perpendicular to the Y-Z plane.

2. The prism optical system according to claim 1, wherein the following condition (1) is satisfied:

$$-4 < cy(x,y)/cx(x,y) < -0.01 \qquad (1)$$

where cy(x, y) stands for a Y-direction curvature of a position of the fourth surface where the center chief ray is reflected off, and cx(x, y) stands for an X-direction curvature of a position of the fourth surface through which the center chief ray transmits, given the surface shape defined by f(x, y) in the position (x, y), the X-direction curvature cx(x, y) and the Y-direction curvature cy(x, y) in the position (x, y) are here intended to the following $$Cx(x, y) = \frac{\frac{\partial^2 f}{\partial x^2}}{\left(1 + \left(\frac{\partial f}{\partial x}\right)^2\right)^{3/2}}$$

$$Cy(x, y) = \frac{\frac{\partial^2 f}{\partial y^2}}{\left(1 + \left(\frac{\partial f}{\partial y}\right)^2\right)^{3/2}}.$$

3. The prism optical system according to claim 2, wherein the third surface is defined by a rotationally asymmetric surface.

4. The prism optical system according to claim 1, wherein total reflection is applied to at least one internal reflection of light by the first surface.

5. The prism optical system according to claim 1, wherein the first surface is defined by a rotationally asymmetric surface.

6. The prism optical system according to claim 1, wherein the first surface has a negative power in the Y-Z plane.

7. The prism optical system according to claim 1, wherein the second surface is defined by a rotationally asymmetric surface.

8. The prism optical system according to claim 1, wherein the second surface has a positive power in the Y-Z plane.

9. An image display apparatus incorporating the prism optical system according to claim 1,
wherein an image display device is located in opposition to the fifth surface of the optical element, and
the eyes of a viewer are positioned in opposition to a transmitting area of the first surface to present an enlarged virtual image to the viewer.

10. An imaging apparatus incorporating the prism optical system according to claim 1,
wherein an imaging device is located in opposition to the fifth surface of the optical element, and
an aperture stop is located in front of and in the vicinity of a transmitting surface of the first surface thereby taking an external-world image.

11. A prism optical system comprising:
an optical element that includes at least five optical surfaces, each having an optical action, wherein at least three out of the at least five optical surfaces are rotationally asymmetric surfaces and one of two surfaces on which light is incident or out of which light exits has one transmission and at least one internal reflection;
in a light ray traveling from an entrance pupil toward an image plane through the optical element, at least a portion of a reflecting surface closest to the image plane along an optical path has a negative power;
the optical element comprises, in order along a path taken by light that enters and exits out of the optical element,
a first surface that defines a transmitting surface as an entrance surface and an internal reflecting surface as well,
a second surface that defines an internal reflecting surface in opposition to the first surface,
a third surface that defines an internal reflecting surface in opposition to the first surface and adjacent to the second surface,
a fourth surface that defines an internal reflecting surface in opposition to the first surface and adjacent to the third surface and an internal reflecting surface closest to the image plane as well, and
a fifth surface that defines a transmitting surface adjacent to the first surface and in opposition to the fourth surface; and
given that the Z-axis positive direction is defined by a direction along a direction of travel of a center chief ray, perpendicular to a plane that defines the entrance pupil, from one point included in a dummy plane that is an origin through the center of the entrance pupil, the Y-Z plane is defined by a plane including the Z-axis and the center of the image plane, and a Y-axis positive direction comes close to a direction from the origin toward the center of the image plane, and an X-axis positive direction is defined by a direction that forms a right-handed orthogonal coordinate system with the Y-axis and the Z-axis,
the fourth surface is defined by a rotationally asymmetric surface having a negative power in the Y-Z plane and a negative power in the X-direction perpendicular to the Y-Z plane.

* * * * *